(12) United States Patent
Bergh et al.

(10) Patent No.: US 6,244,333 B1
(45) Date of Patent: Jun. 12, 2001

(54) CORRUGATED FOLDED PLATE HEAT EXCHANGER

(75) Inventors: Charles J. Bergh, Berwyn; Peter J. McKee, Downington; George H. Alexander, Hatfield, all of PA (US)

(73) Assignee: Zeks Air Drier Corporation, West Chester, PA (US)

( * ) Notice: Subject to any disclaimer, the term of this patent is extended or adjusted under 35 U.S.C. 154(b) by 0 days.

(21) Appl. No.: 09/315,096

(22) Filed: May 19, 1999

Related U.S. Application Data

(60) Provisional application No. 60/098,137, filed on Aug. 27, 1998.

(51) Int. Cl.$^7$ ............... F28D 9/00; F28D 21/00
(52) U.S. Cl. ............... 165/165; 165/157
(58) Field of Search ............... 165/157, 165, 165/166

(56) References Cited

U.S. PATENT DOCUMENTS

| Re. 23,144 | 9/1949 | Andersen . |
| D. 254,506 | 3/1980 | Holmberg . |
| 574,157 | 12/1896 | Ljungstrom . |
| 799,621 | 9/1905 | Brewtnall . |
| 817,490 | 4/1906 | Jarvis . |
| 1,382,670 | * 6/1921 | Price ............... 165/163 |
| 1,734,274 | 11/1929 | Schubart . |
| 1,777,356 | 10/1930 | Fisher . |
| 1,791,483 | 2/1931 | Dalgliesh . |

(List continued on next page.)

FOREIGN PATENT DOCUMENTS

| 2 301 345 | 7/1974 | (DE) . | |
| 2810 094A1 | 10/1978 | (DE) | ............... F24F/3/14 |
| 30 06 988 A1 | 9/1981 | (DE) | ............... F28D/9/00 |
| 029573 | 6/1981 | (EP) | ............... F28D/21/00 |
| WO82/00194 | 1/1982 | (EP) | ............... F28F/3/00 |
| 303 492 A2 | 2/1989 | (EP) | ............... F28F/3/00 |
| 596599 | 5/1994 | (EP) | ............... F25J/3/00 |
| 2 269 694 | 11/1975 | (FR) | ............... A61M/1/36 |
| 2 367 265 | 5/1978 | (FR) | ............... F28D/9/00 |
| 320279 | 10/1929 | (GB) . | |
| 512689 | 9/1939 | (GB) . | |
| 55-118598 | 3/1979 | (JP) | ............... F28F/3/08 |
| 6-194082 | 12/1992 | (JP) | ............... F28F/3/08 |
| WO 84/03353 | 8/1984 | (WO) . | |
| WO 95/30867 | 11/1995 | (WO) . | |

OTHER PUBLICATIONS

Walas Chemical Process Equipment "Selection and Design" 1988 p. 434.

*Primary Examiner*—Allen Flanigan
(74) *Attorney, Agent, or Firm*—Caesar, Rivise, Bernstein, Cohen & Pokotilow, Ltd.

(57) ABSTRACT

Heat exchangers including elongated hollow housings having inlet and outlet ports for circulating first and second fluid media through the housings and whereby each housing includes a heat exchanging core that is formed of a single, folded corrugated sheet. The sheet is formed with a series of parallel peaks and valleys running angularly to the direction of the sheet so that when the sheet is folded there are defined a plurality of channels by reason of the crisscross pattern of peaks and valleys crossing one another at right angles in the tightly folded configuration of the core. The folded configuration provides discrete respective channels for conveying the first and second fluid media. In the preferred embodiment of the heat exchangers, every fold of the corrugated sheet is in contact with the housing interior and thereby form alternating isolated channels without the need to use any top, bottom or side seals around the core. Thus, differential internal pressures in these channels are transmitted to the housing via the adjacent channel peaks which engage and then are transmitted to the housing via the folds of the sheet which are in contact with the housing.

11 Claims, 11 Drawing Sheets

U.S. PATENT DOCUMENTS

| | | |
|---|---|---|
| 1,833,166 | 11/1931 | Lucke . |
| 1,853,322 | 4/1932 | Rose . |
| 1,932,950 | 10/1933 | Annis . |
| 1,998,974 * | 4/1935 | Sunday . |
| 2,019,351 | 10/1935 | Lathrop . |
| 2,147,719 | 2/1939 | Simons . |
| 2,288,061 | 6/1942 | Arnold . |
| 2,321,110 * | 6/1943 | Shipman . |
| 2,449,922 | 9/1948 | Andersen . |
| 2,566,928 | 9/1951 | Carter . |
| 2,576,213 | 11/1951 | Chausson . |
| 2,588,500 | 3/1952 | Dugan . |
| 2,610,832 | 9/1952 | Holmes et al. . |
| 2,953,110 * | 9/1960 | Etheridge ............................ 165/157 |
| 2,990,162 | 6/1961 | Otten . |
| 3,040,500 | 6/1962 | Walker et al. . |
| 3,104,218 | 9/1963 | Speidel et al. . |
| 3,176,762 | 4/1965 | Greenwood et al. . |
| 3,240,268 | 3/1966 | Armes . |
| 3,282,334 | 11/1966 | Stahlheber . |
| 3,292,691 | 12/1966 | Welter et al. . |
| 3,331,435 | 7/1967 | Valvi . |
| 3,369,592 | 2/1968 | Dedow . |
| 3,372,743 | 3/1968 | Pall et al. . |
| 3,399,719 | 9/1968 | Forrest et al. . |
| 3,403,727 | 10/1968 | Becker . |
| 3,508,607 * | 4/1970 | Herrmann ............................ 165/166 |
| 3,532,161 | 10/1970 | Lockel . |
| 3,540,702 | 11/1970 | Uyama . |
| 3,568,462 | 3/1971 | Hoffman et al. . |
| 3,584,682 * | 6/1971 | Leedham et al. .................... 165/164 |
| 3,626,481 | 12/1971 | Taylor et al. . |
| 3,640,340 | 2/1972 | Leonard et al. . |
| 3,719,227 * | 3/1973 | Jenssen ................................ 165/166 |
| 3,720,071 | 3/1973 | Nasser et al. . |
| 3,731,737 | 5/1973 | Jenssen . |
| 3,734,177 | 5/1973 | Bellovary et al. . |
| 3,757,856 | 9/1973 | Kun . |
| 3,759,322 | 9/1973 | Nasser et al. . |
| 3,785,620 | 1/1974 | Huber . |
| 3,808,104 | 4/1974 | Davidson . |
| 3,829,945 * | 8/1974 | Kanzler et al. ...................... 165/166 |
| 3,849,076 | 11/1974 | Gryaznov et al. . |
| 3,907,032 | 9/1975 | DeGroote et al. . |
| 3,941,188 | 3/1976 | Scheidl . |
| 3,963,810 | 6/1976 | Holmberg et al. . |
| 3,992,168 | 11/1976 | Toyama et al. . |
| 3,996,102 | 12/1976 | Thome . |
| 4,013,121 | 3/1977 | Berger et al. . |
| 4,058,161 | 11/1977 | Trepaud . |
| 4,083,695 | 4/1978 | Haese et al. . |
| 4,090,918 | 5/1978 | Masetti . |
| 4,099,928 | 7/1978 | Norback . |
| 4,116,271 | 9/1978 | De Lepereire ...................... 165/166 |
| 4,128,221 | 12/1978 | Straffi . |
| 4,154,295 | 5/1979 | Kissinger . |
| 4,176,713 | 12/1979 | Fisher . |
| 4,186,159 | 1/1980 | Huber . |
| 4,212,351 | 7/1980 | Van Hagan et al. . |
| 4,246,962 | 1/1981 | Norback . |
| 4,254,827 | 3/1981 | Forster et al. . |
| 4,286,366 | 9/1981 | Vinyard . |
| 4,291,759 | 9/1981 | Sumitomo . |
| 4,296,050 | 10/1981 | Meier . |
| 4,301,864 | 11/1981 | Kivikas et al. . |
| 4,303,123 | 12/1981 | Skoog . |
| 4,307,779 | 12/1981 | Johansson et al. . |
| 4,311,187 | 1/1982 | Small . |
| 4,354,551 | 10/1982 | Kristoffersson et al. . |
| 4,374,542 | 2/1983 | Bradley . |
| 4,384,611 | 5/1983 | Fung . |
| 4,433,721 | 2/1984 | Biaggi . |
| 4,450,904 | 5/1984 | Volz . |
| 4,455,339 | 6/1984 | Meier . |
| 4,460,388 | 7/1984 | Fukami et al. . |
| 4,470,455 | 9/1984 | Sacca . |
| 4,501,321 | 2/1985 | Real et al. . |
| 4,574,007 | 3/1986 | Yearout et al. . |
| 4,597,916 | 7/1986 | Chen . |
| 4,599,097 | 7/1986 | Petit et al. . |
| 4,604,247 | 8/1986 | Chen et al. . |
| 4,606,745 | 8/1986 | Fujita . |
| 4,646,822 | 3/1987 | Voggenreiter et al. . |
| 4,657,072 | 4/1987 | Mulock-Bentley . |
| 4,699,212 | 10/1987 | Andersson et al. . |
| 4,715,431 | 12/1987 | Schwarz et al. . |
| 4,781,248 | 11/1988 | Pfeiffer . |
| 4,804,040 | 2/1989 | Jan-Ove et al. . |
| 4,813,478 | 3/1989 | Jonsson et al. . |
| 4,848,451 | 7/1989 | Jonsson et al. . |
| 4,874,039 | 10/1989 | Nilsson . |
| 4,911,235 | 3/1990 | Andersson et al. . |
| 4,915,165 | 4/1990 | Dahlgren et al. . |
| 4,945,981 | 8/1990 | Joshi . |
| 4,950,430 | 8/1990 | Chen et al. . |
| 4,966,227 | 10/1990 | Andersson . |
| 4,981,621 | 1/1991 | Pluss . |
| 4,987,955 | 1/1991 | Bergqvist et al. . |
| 5,088,552 | 2/1992 | Raunio . |
| 5,100,448 | 3/1992 | Lockett et al. . |
| 5,154,859 | 10/1992 | Bosquain et al. . |
| 5,174,370 | 12/1992 | Hallgren . |
| 5,178,207 | 1/1993 | Bergqvist et al. . |
| 5,188,773 | 2/1993 | Chen et al. . |
| 5,224,351 | 7/1993 | Jeannot et al. . |
| 5,226,473 | 7/1993 | Knutsson et al. . |
| 5,226,474 | 7/1993 | Hallgren . |
| 5,262,095 | 11/1993 | Bosquain et al. . |
| 5,267,444 | 12/1993 | Lehman et al. . |
| 5,379,832 * | 1/1995 | Dempsey ............................ 165/110 |
| 5,700,403 | 12/1997 | Billingham et al. . |
| 5,732,460 | 3/1998 | Paternoster et al. . |
| 5,876,638 | 3/1999 | Sunder et al. . |

* cited by examiner

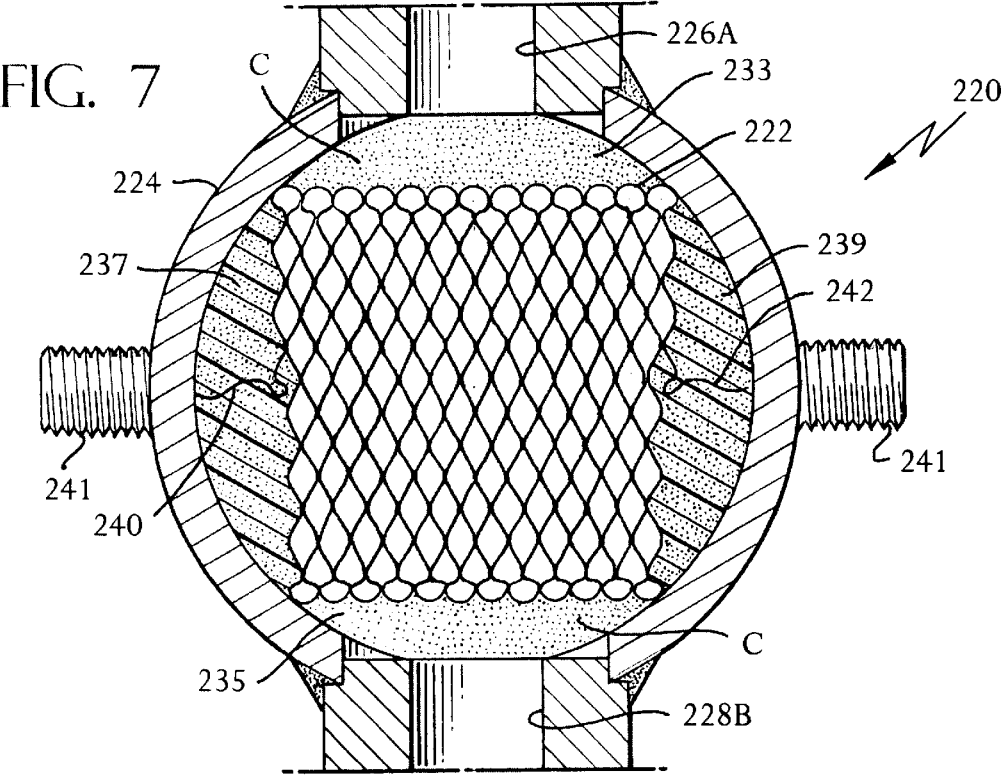
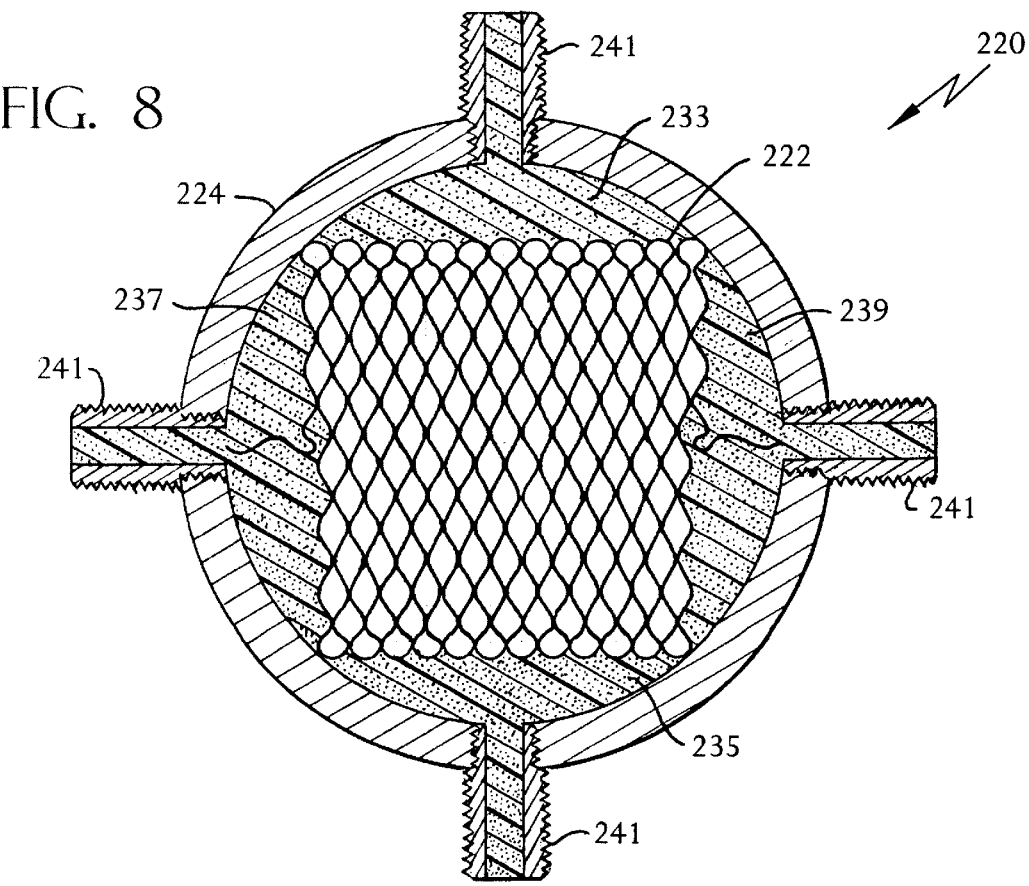

CORRUGATED FOLDED PLATE HEAT EXCHANGER

RELATED APPLICATIONS

This application claims the benefit of U.S. Provisional Patent Application No. 60/098,137 filed on Aug. 27, 1998, entitled CORRUGATED FOLDED PLATE HEAT EXCHANGER APPARATUS and whose disclosure is incorporated by reference herein.

FIELD OF THE INVENTION

The present invention relates to heat exchangers and more specifically to improvements in heat exchange devices.

BACKGROUND OF THE INVENTION

The use of heat exchangers is known in the prior art.

For example, U.S. Pat. No. 574,157 (Ljungstrom) describes a heat exchanger, wherein each single flow path (chamber) for one of the fluids is formed from a single sheet, which has been impressed with diagonal corrugations then folded over and sealed. This design is inherently a cross flow heat exchanger with the direction of flow of one fluid is at right angles to the direction of flow of the other fluid. The construction cannot be used for parallel flow heat exchanger. Structural support within the bundle is obtained by the crossing of the corrugations. The passageways formed have cross flow perpendicular to the direction of folding or rolling. Multiple flow passages for each fluid are created by stacking several individual chambers in a parallel arrangement. Accordingly, the corrugated surface for the Ljungstrom device is folded once then closed, i.e., the edges are sealed, to form a chamber. The chamber is then rolled or folded to form the passages for the second fluid. By contrast, in accordance with the present invention, as will be discussed later, the corrugated surface is folded multiple times to form multiple adjacent passages for the two fluids. The sheet is never closed, i.e., the edges are not sealed. There is no further folding required or stacking of several individual chambers. The Ljungstrom device is inherently a cross flow heat exchanger and the present invention is inherently a parallel flow heat exchanger. Even though FIGS. 15 and 16 of the Ljungstrom patent show a cylindrical pressure vessel providing structural support, there does not appear to be any structural support shown for the interior of the coiled chambers. Furthermore, the folded edges of the chambers may not be supported as the support would prevent flow of the second fluid. Thus, the Ljungstrom device may not withstand high differential pressure or high absolute pressure of the two fluids. The headers for introduction of fluid are not equivalent or equal to the headers for fluid as they are in the heat exchanger of the present invention.

U.S. Pat. No. 3,640,340 (Leonard et al.) discloses a heat exchange surface formed from a single sheet by folding with flow parallel to the folds and ports at the periphery of the bundle to introduce flow onto and remove the flow from the bundle. It shows embedded side and end seals and a flow seal function built into the manifolds. However, unlike the present invention, as will be discussed later, the Leonard et al. device includes no diagonal corrugations, which provide structural rigidity and flow turbulence. There is no separate cylindrical pressure vessel, i.e., the configuration is not optimum for resistance to pressure forces. The seals do not contribute to the carrying of structural loads due to pressure. The potting for the embedded seals is not further structurally supported by the pressure vessel and the headers are not inherently defined by the space between the pressure vessel, the bundle and the back of the flow seal and the embedded end seal.

U.S. Pat. No. 3,759,322 (Nasser et al.) discloses a heat exchanger whereby the passages of the heat exchanger are defined by stacks of identical diagonally corrugated and lipped plates oriented in alternating fashion, such that the lips can be welded together. Inside the passages are stacks of a differently sized plate utilized for structural support (through crossed corrugations). The housing is rectangular with partitioned inlets and outlets for fluids. The Nasser et al. heat exchanger is constructed from multiple plates welded together to form separate passages whereas the present invention is constructed from a single sheet. In the Nasser et al. device, the passages contain a smaller auxiliary corrugated plate for structural support and thermal storage whereas the present invention does not use auxiliary plates nor attempt to use thermal storage. The Nasser et al. device lacks embedded seals or flow seals, which also provide structural support between the bundle and the vessel, and which help to define port areas.

U.S. Pat. No. 2,288,061 (Arnold) discloses an oil cooler/heat exchanger having a core for the cross flow heat exchanger that is comprised of a stack of formed, corrugated plates, which are assembled in a frame to create cross flow passages and barriers to commingling of the two fluids. The core is dip brazed or soldered to obtain fluid seals and structural strength. The soldering joins the faying surfaces of nesting corrugations and the crossed apices of the corrugations. Among other things, one difference between the Arnold device and the present invention is the manifold. In the Arnold device, there is a cross flow and not parallel flow. In the Arnold device, the corrugations are not diagonally disposed relative to the flow. Instead, the corrugations of one plate are in line with the flow and the corrugations of the adjacent plate lie across the direction of flow. This is a disadvantage as the flow path is not of constant area, but varies between full area and half area. This promotes heat exchanges at the expense of relatively much greater pressure drop. There are no embedded seals, or seal materials as part of the load path in the Arnold device and the passages are not defined by folding of a single sheet as is the case with the heat exchanger of the present invention.

U.S. Pat. No. 4,099,928 (Norback) discloses a cross flow heat exchanger constructed of a stack of diagonally corrugated, formed sheets with displaced edges, which form sealing surfaces. The orientation of adjacent sheets in the stack is adjusted to form adjacent sealed passages for fluids (1) and (2). The edges, which form sealing surfaces, are sealed by immersion in a sealer or by hemming (folding). A special corner seal serves to prevent commingling of the fluids at corners of the exchanger. The Norback system utilizes a cross flow rather than a parallel flow, as does the present invention, as will be described later. The Norback system also utilizes a stack of separate plates, not folded from a single sheet and the seals are not embedded seals.

U.S. Pat. No. 3,734,177 (Bellovary, et al.) discloses a parallel flow heat exchanger with adjacent passages defined by a non-corrugated sheet, which has been accordion folded. The pressure vessel is rectangular in shape and is shaped to define the flow ports. Longitudinal edges of the folded core are joined to two pressure vessel halves by a folded, soldered seam. The ends are sealed by two separate fingered plates each, which are sealed and joined by soldering or brazing. Turbulence is promoted and heat transfer increased by the addition of turbulator fins (separately formed sheets) into passageways. Some of the differences between the Bellovary et al. device and the present invention include: a heat exchange surface that is not corrugated, but is rather plain (which does not promote heat transfer which normally is improved by separate 'turbulator' elements placed within the folds); the Bellovary et al. device seals are all flow-to-outside. The primary goal of the Bellovary et al. device construction is to make seals accessible for brazing and visible for inspection. In contrast, some of the heat exchanger embodiments of the present invention have embedded flow-to-flow seals (the flow-to-outside sealing is accomplished by a separate pressure vessel). The Bellovary et al. device pressure containment means is rectangular with longitudinal seams whereas the present invention pressure containment means is a separate cylindrical pressure vessel (the optimum shape). In the Bellovary et al. device there are no seals in the path from the heat transfer surface to the pressure containment means and the device will not support itself structurally.

U.S. Pat. No. 3,372,743 (Pall et al.) discloses a heat exchanger in which the primary heat exchange surface is impressed with longitudinal (not diagonal) corrugations. The surface is then folded. Corrugated separator plates are placed between the pleats, to space them apart, so that fluid can enter for the purpose of heat exchange. The flow arrangement is parallel flow. Structural strength is achieved by heavy pressure containing walls or by brazing together the crossed corrugations of the separator plates. Some of the differences between the present invention and the Pall et al. device are that the latter device's corrugations create individual passages (even the 'cross corrugations'), which extend the full length of the heat transfer surface. In contrast, in the heat exchanger of the present invention, the diagonal corrugations do not extend full length of the surface and, in fact, this is not desirable. Furthermore, the Pall et al. device's corrugated, convoluted surface must be spaced apart by a separate corrugated separator plate to permit entry of fluid into the flow passages. Or, if the separator plates are smooth, a separately formed dimple (not part of the corrugation) must be impressed into the main surface to permit flow across the corrugations and into the bundle. The seals are not embedded as in the present heat exchanger. Seals are fluid-to-outside, not fluid-to-fluid as in the present invention.

Seals are part of the load path to the pressure vessel in one embodiment of the heat exchanger of the present invention and they are not in any of the following patents; the housings contain the flow distribution means. In contrast, in the present invention, in one embodiment, flow distribution means is defined by the periphery of the bundle, the cylindrical housing and the seals.

U.S. Pat. No. 817,490 (Jarvis) discloses an exchanger comprising of stacked, diagonally corrugated plates, flow entry through holes in the plates and a frame for clamping the plates.

U.S. Pat. No. 799,621 (Brewtnall) discloses an exchanger comprised of separate plates, diagonally corrugated and special inlet and outlet means for cross flow heat exchange.

U.S. Pat. No. 4,460,388 (Fukami et al.) discloses an exchanger comprised of a convoluted (folded) main surface (without corrugations). The walls of the main surface are spaced apart by separate spacer places, formed with corrugations, which serve as flow guides in the space between the folds.

British Patent 320,279 has a folded exchanger with an enhancement by corrugations and means for creating multiple separate flow plates and has a rectangular pressure vessel.

Japanese Patent 6-19408 has a folded exchanger surface with no corrugations and is not similar to the present invention.

It should be noted that in the distillation art, U.S. Pat. No. 5,700,403 (Billingham et al.) discloses a distillation column utilizing a packing element which reduces wall flow by varying corrugated sheet lengths. By varying the lengths of the corrugated sheet lengths to minimize the gap between the packing element and the column wall, any wall flow is driven back in towards the packing element. U.S. Pat. No. 5,224,351 (Jeannot et al.) discloses an air distillating column that utilizes a distributor element having individual linings with different lengths that span the circular perimeter of the interior of the column. However, among other things, neither of these references teach or suggest the utilization of a single sheet for transferring flow loads into the pressure vessel housing, as in the present invention.

Thus, there remains a need for a low cost heat exchanger that can accomplish heat transfer in an efficient manner between two flowing media while simultaneously transferring the pressure loads of the two flowing media to the pressure vessel walls.

OBJECTS OF THE INVENTION

Accordingly, it is the general object of this invention to provide an invention that overcomes the disadvantages of the prior art.

It is an object of the present invention to provide an apparatus and method for heat exchange that utilizes a large surface for heat exchange, i.e., where the $\Delta Q$ is high.

It is still yet a further object of the present invention to provide an apparatus and method that causes heat exchange to occur with flow efficiency, i.e., where the $\Delta P$ is low.

It is still yet another object of the present invention to provide an apparatus and method that transfers the loads from the flows into the pressure vessel walls of the heat exchanger.

It is a further object of the present invention to provide an apparatus and method that transfers the structural loads from the flows into adjacent fold portions of the heat transfer surfaces.

It is still yet another object of the present invention to provide an apparatus and method that is compact, i.e., the apparatus and method utilize low hold-up volume.

It is a further object of this invention to provide an apparatus and method for heat exchange that involves an automated manufacturing process, thereby increasing heat exchanger reliability while reducing labor costs.

It is still a further object of this invention to provide an apparatus and method for heat exchange that involves low materials costs.

It is still yet a further object of this invention to provide an apparatus and method for heat exchange that involves low header costs.

It is still yet another object of the present invention to provide an apparatus and method for a heat exchanger that involves low manufacturing costs.

It is a further object of this invention to provide a core bundle that provides a plurality of channels for flows that presents a constant area to the flows.

It is yet another object of this invention to provide a plurality of channels for flows that generates turbulence within each channel to promote heat exchange.

It is still yet another object of this invention to provide a plurality of channels having a structure that causes frequent and periodic changes in the direction of the flows to, among other things, minimize the boundary layer that would normally form between the flow and the channel walls.

SUMMARY OF INVENTION

These and other objects of the instant invention are achieved by providing a heat exchanger that comprises: (a) an elongated housing (e.g., stainless steel, etc. that has a thickness to withstand high, internal pressure) having a first set of inlet and outlet ports for circulating a first medium (e.g., air) through the housing and a second set of inlet and outlet ports for circulating a second medium (e.g., refrigerant) through the housing and where the housing has an interior wall; and (b) a core comprising a continuous sheet (e.g., a corrosion-resistant, temperature resistant, low cost material such as stainless steel, titanium, etc.) having corrugations running angularly to the direction of the sheet and wherein the sheet is folded such that each of the folds is in contact with the interior wall to form alternating isolated channels within the housing. The alternating isolated channels comprise a first set of channels that is in fluid communication with the first set of ports and a second set of channels that is in fluid communication with the second set of ports and wherein the first and second media form parallel flows within the respective sets of channels.

These and other objects of the instant invention are also achieved by providing a method for providing a heat exchanger for supporting heat exchange between two fluid media. The method comprises:(a) providing a continuous sheet (e.g., a corrosion-resistant, temperature resistant, low cost material such as stainless steel, titanium, etc.) having corrugations running angularly to the direction of the sheet; (b) providing a first elongated housing shell having a first set of input and output ports for a first medium flow and a second elongated housing shell having a second set of input and output ports for a second medium flow and wherein the shells (e.g., stainless steel, etc. that has a thickness to withstand high, internal pressure) have side edges for joining together to form a housing having an interior wall and a hollow interior, (c) folding the continuous sheet, excluding the ends, into a plurality of folds such that each one of the plurality of folds is in contact with the interior wall when the folded sheet is positioned in the hollow interior; (d) positioning the folded continuous sheet into the first elongated housing shell so that each one of the ends of the continuous sheet is positioned on a respective side edge of the first elongated housing shell; (e) joining (e.g., welding) the second elongated housing shell to the first elongated housing shell along their side edges; and (f) closing off a first end of the housing and a second end of the housing (e.g., brazing end caps on each end of the housing).

These and other objects of the instant invention are also achieved by providing a heat exchanger that comprises: (a) a generally-circular elongated housing (e.g., stainless steel, etc. that has a thickness to withstand high, internal pressure) having a first set of inlet and outlet ports for circulating a first medium through the housing and a second set of inlet and outlet ports for circulating a second medium through the housing and wherein the housing has an interior wall; (b) a core comprising a continuous sheet (e.g., a corrosion-resistant, temperature resistant, low cost material such as stainless steel, titanium, etc.) having corrugations running angularly to the direction of the sheet and wherein the sheet is folded such that each of the folds is in contact with the interior wall; (c) the housing includes side seals of a quick setting liquid epoxy material for filling the space between the core and the housing in a region between sides of the core and the interior wall, and (d) wherein the core and side seals form alternating isolated channels within the housing. The alternating isolated channels comprise a first set of channels that is in fluid communication with the first set of ports and a second set of channels that is in fluid communication with the second set of ports. The first and second media form parallel flows within the respective sets of channels.

These and other objects of the present invention are also achieved by providing a heat exchanger comprising: (a) an elongated housing (e.g., stainless steel, etc. that has a thickness to withstand high, internal pressure) having a first set of inlet and outlet ports for circulating a first medium through the housing and a second set of inlet and outlet ports for circulating a second medium through the housing; (b) a core comprising a continuous sheet (e.g., a corrosion-resistant, temperature resistant, low cost material such as stainless steel, titanium, etc.) having corrugations running angularly to the direction of the sheet and wherein the sheet is folded into a rectangular shape comprising a plurality of folds of the same length, (c) the housing is of generally circular configuration and includes top and bottom seals of a quick setting liquid epoxy material filling the space between the core and the housing in a region between the first set of inlet and outlet ports and between the second set of inlet and outlet ports and further including side seals of a quick setting liquid epoxy material filling the space in a region between sides of the core and housing; (d) the core, the top and bottom seals and the side seals form alternating isolated channels within the housing, the alternating isolated channels comprising a first set of channels that is in fluid communication with the first set of ports and a second set of channels that is in fluid communication with the second set of ports. The first and second media form parallel flows within the respective sets of channels.

These and other objects of the instant invention are also achieved by providing a method for providing a heat exchanger for supporting heat exchange between two fluid media. The method comprises the steps of: (a) providing a continuous sheet (e.g., a corrosion-resistant, temperature resistant, low cost material such as stainless steel, titanium, etc.) having corrugations running angularly to the direction of the sheet; ( b ) providing a generally-circular elongated housing (e.g., stainless steel, etc. that has a thickness to withstand high, internal pressure) having a first set of input and output ports for a first medium flow and a second set of input and output ports for a second medium flow, and wherein the housing has an interior wall; (c) folding the continuous sheet, excluding the ends of the sheet, into a plurality of folds to form a rectangularly-shaped core; (d) positioning the folded continuous sheet into the generally-circular elongated housing; (e) closing off a first end of the housing and a second end of the housing; (f) inserting end seals at the first end and the second end of the housing; (g) introducing top and bottom seals between the top of the core and the interior wall and between the bottom of the core and the interior wall; and (h) introducing side seals between the sides of the core and the interior wall and embedding the ends of the sheet therein.

These and other objects of the instant invention are also achieved by providing a heat exchanger comprising: (a) an elongated housing (e.g., stainless steel, etc. that has a thickness to withstand high, internal pressure) having a first set of inlet and outlet ports for circulating a first medium through the housing, a second set of inlet and outlet ports for circulating a second medium through the housing, and a third set of transfer ports and wherein the first set of inlet and outlet ports are located at one end of the housing; (b) a core comprising a continuous sheet (e.g., a corrosion-resistant, temperature resistant low cost material such as stainless steel, titanium, etc.) having corrugations running angularly to the direction of the sheet and wherein the sheet is folded into a rectangular shape comprising a plurality of folds of the same length; (c) the housing being of generally circular configuration and including top and bottom seals of a quick setting liquid epoxy material filling the space between the core and the housing in a region between the first set of inlet and outlet ports and between the second set of inlet and outlet ports and further including side seals of a quick setting liquid epoxy material filling the space in a region between sides of the core and housing; (d) the core, the top and bottom seals and the side seals forming alternating isolated channels within the housing, the alternating isolated channels comprising a first set of channels that is in fluid communication with the first set of ports and a second set of channels that is in fluid communication with the second set of ports. The first and second media form parallel flows within the respective sets of channels; (e) a first space plate mounted in the housing extending from a top interior wall of the housing to a bottom edge of the core in sealing relation therewith and defining a first and second subset of channels in the first set of channels, and wherein one side of the space plate between the space plate and the top of the core communicates with the inlet port of the first set of ports and the opposite side of the space plate communicates with the outlet port of the first set of ports and wherein the space plate includes a gap adjacent an end of the housing remote from the end where the inlet and outlet ports are located. The space plate acts to route the first medium through the first subset of channels away from the inlet port and the gap acting to route the first medium through the second subset of channels toward the outlet port; (f) a second space plate mounted in the housing extending from a bottom interior wall of the housing to a top edge of the core in sealing relation therewith and defining a third and fourth subset of channels in the second set of channels; and (g) external piping coupled to the third set of transfer ports for altering the flow of the first medium from the first inlet port towards the outlet port, the external piping routing the first medium through a combination of the first, second and third subsets of channels from the first inlet port towards the outlet port.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 7 is an enlarged sectional view taken along line 7—7 of FIG. 6;

FIG. 8 is an enlarged sectional view taken along line 8—8 of FIG. 6;

DETAILED DESCRIPTION OF THE PREFERRED EMBODIMENTS

The preferred heat exchanger 120 (FIG. 1) of the present invention is characterized by novel features of construction arrangement providing certain advantages over the prior art discussed above.

In the operation of a heat exchanger, differential pressure forces in the core may cause distortion of the core and, in accordance with the design of the present invention, these forces are carried out more effectively due to the conformity of the core bundle to the pressure vessel housing. In the preferred embodiment 120 of the present invention, there is a total conformity of the core 122 to the pressure vessel housing. As can be see in FIG. 2, the folds (F) of the core bundle are in contact with the interior of the pressure vessel housing. In this regard, the diagonal crisscross of the peaks of the corrugated folded sheet 122 (FIG. 5, referred to as the "core bundle" or simply "bundle") defining the flow channels and the conformity of the core to the housing strengthens the structure both in the vertical and the horizontal directions. Furthermore, the diagonal crisscross of the peaks of the core 122 and the conformity of the core 122 to the housing provides a load path in the bundle to resist internal forces. Specifically, in the preferred embodiment 120 of the present invention, differential internal pressures in the flow channels are transmitted to the housing via the adjacent channel peaks that engage each other. In this regard, it has been found that the design of the present invention does not require brazed joints and is more effective in transmitting internal loads.

In accordance with the present invention, the heat exchanger surfaces which define and separate adjacent flow passageways, are formed from a single sheet of thin metal. The sheet is first impressed with diagonally-oriented corrugations. The sheet is then folded with the folds perpendicular to the long edge of the sheet and the directions of the adjacent folds are alternated to produce an "accordion" or pleated surfaces.

The sheet material is chosen for its corrosion resistance, temperature resistance and cost. A suitable material is stainless steel or titanium. The sheet thickness is chosen as required to support the differential pressure between the flow paths. The corrugated, folded exchanger surface is called the "bundle" after fabrication.

Figure 5:
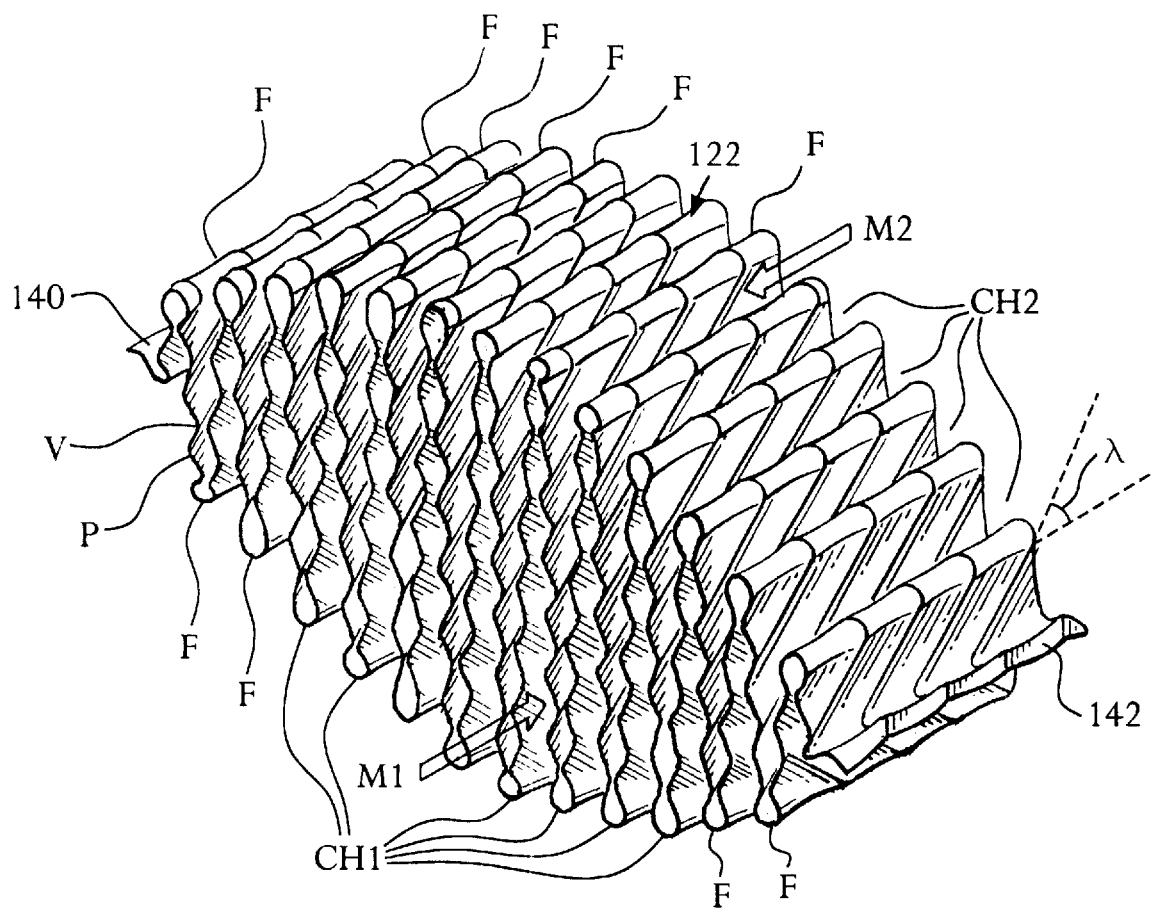
FIG. 5 is an isometric view of the corrugated folded bundle of FIG. 1.
Figure 6:
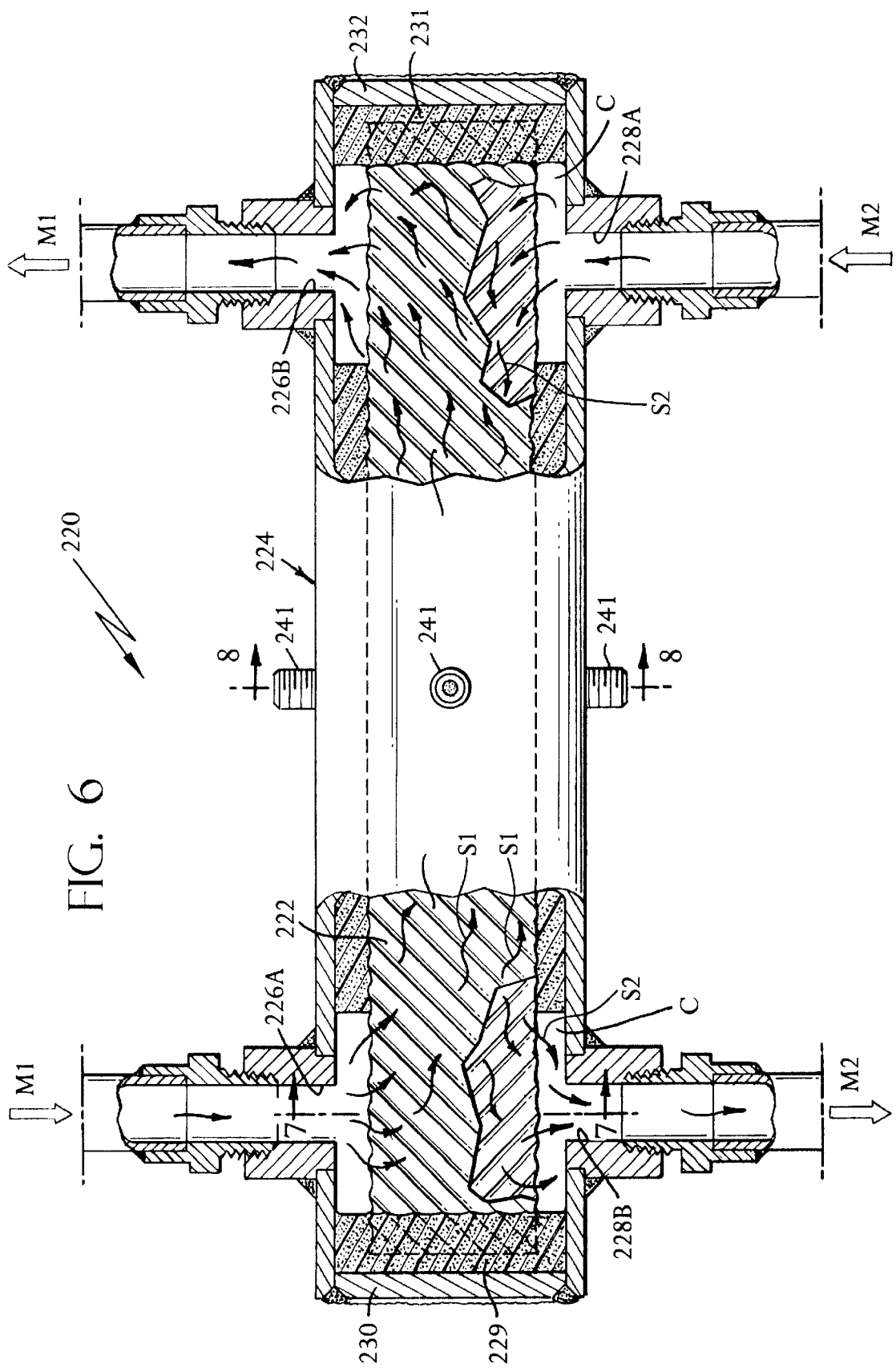
FIG. 6 is a plan view with portions broken away and in section to show details of the construction of a second embodiment of the corrugated folded heat exchanger of the present invention.
Figure 9:
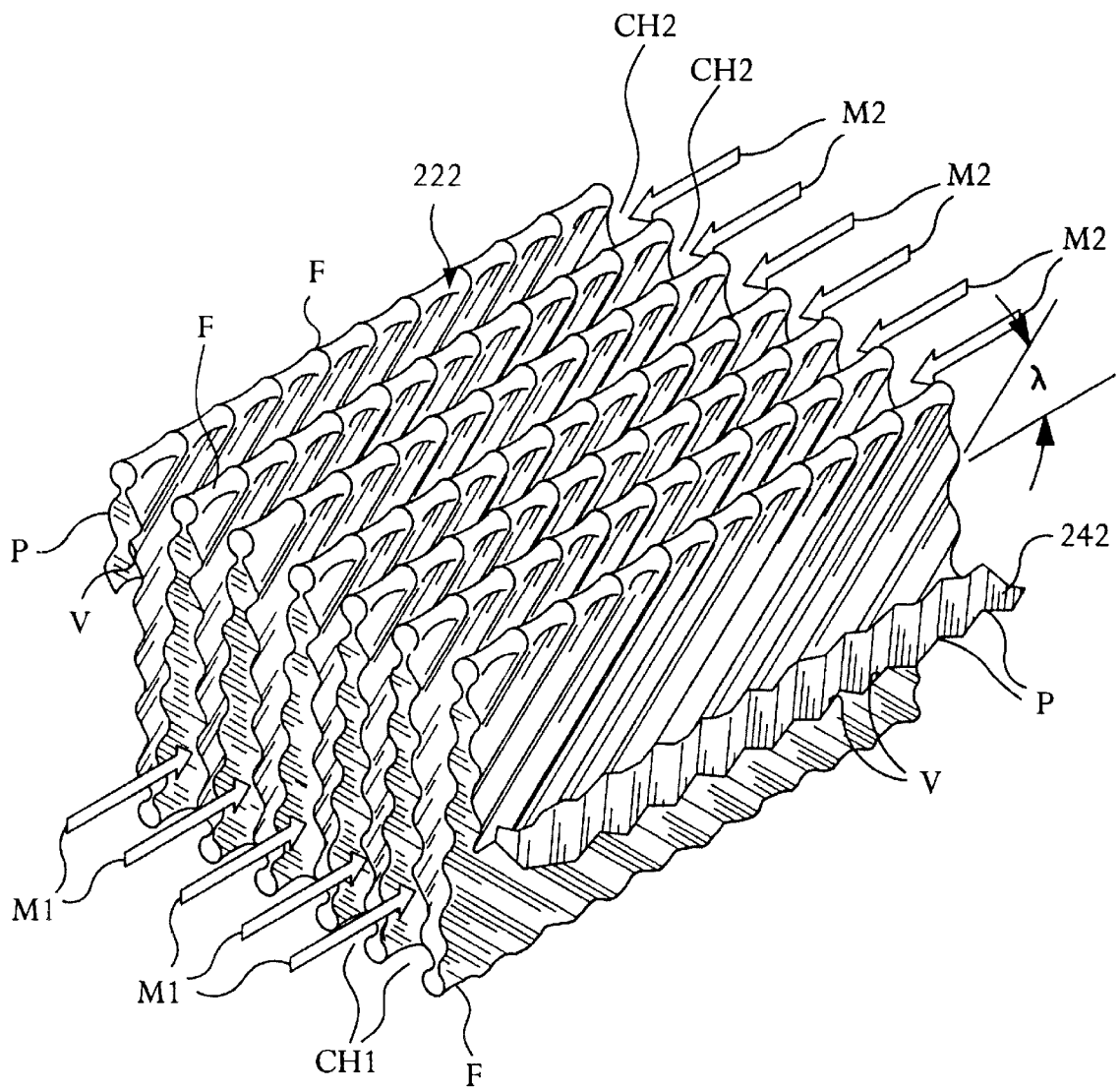
FIG. 9 is a fragmentary isometric view showing a small portion of the heat exchanger core of the second embodiment in a slightly expanded state to more easily visualize the fluid flow paths created by the equal increment folding of a thin corrugated sheet metal strip.

The flow of two mediums (gas or liquid) between which heat is to be exchanged is substantially parallel to the exchanger folds, not perpendicular to the folds. A parallel flow arrangement permits a higher effectiveness of heat transfer than does a cross flow arrangement. For example, in a parallel flow arrangement, the two flows are in a heat-exchanging condition over a longer surface area in comparison to a cross flow arrangement where the two flows are in a heat-exchanging condition only where the two flows "cross." Furthermore, where the parallel flow arrangement is a "counter" flow (i.e., the two flows are in opposite directions and as depicted in FIGS. 5–6 and 9), there is even a greater heat-exchanging condition or potential since the high temperature input of one flow is opposite of the low temperature output of the other flow.

Folding of the diagonally corrugated surface causes the corrugations of adjacent pleats to cross. The crossed corrugations provide structural rigidity by reason of the corrugations touching and therefore carrying, by compression, the differential pressure load to the periphery of the bundle and then transferring the load to the pressure vessel housing.

In all of the embodiments, the crossed corrugations impart turbulence to the heat exchange flows at relatively low velocity. This promotes high heat transfer. The mechanism for this is that the flow cannot process more than one corrugation pitch length before encountering another corrugation or a corrugation crossing point. Thus, the crossing of the diagonal corrugations creates frequent directional changes for the flow, while maintaining essentially constant flow area. The corrugations allow more surface area to be packaged into a given volume than achievable with plain surfaces. The surfaces obtained are 'prime', i.e., they are directly between the fluids and are not 'extended' or finned. Finned surfaces are less efficient and tend to foul, while prime surfaces have a relatively lower tendency to foul.

The core bundle having flat ends is inserted into a cylindrical pressure vessel housing. The material and thickness of the pressure vessel is chosen to withstand the maximum gage pressure of the two heat exchange fluids and to meet corrosion requirements. A suitable material for the pressure vessel is carbon steel or stainless steel. The ports or header spaces perform the function of distributing the heat exchange fluids into or out of the heat exchange bundle in a manner which incurs as little pressure drop as possible. A port area is defined by the pressure vessel and the bundle. The shape of the port is inherently well suited to flow distribution. Flow is introduced into the bundle at the periphery where the rounded contour of the folds causes little pressure drop. Furthermore, the length of the port can be chosen to minimize pressure drop.

These independent variables are selected by the designer to match the requirements of the heat exchanger problem as follows: bundle sheet material and thickness; bundle cross section dimensions; pressure vessel material and thickness; port area (length of the port); length of the main heat exchanger zone in the bundle (length between the ports); and material for the cast seals (for the second embodiment).

There is shown in the drawings two basic embodiments of the present invention. The first and preferred embodiment (FIGS. 1–5) has a core that completely conforms to the inner periphery of the pressure vessel housing to thereby more effectively handle or counteract the differential pressure forces in the core which, in the prior art systems, cause distortion problems. The second, third, fourth and fifth heat exchanger embodiments (FIGS. 6–21) have respective cores of generally rectangular cross-sections and respective pressure vessel housings of generally circular cross-sections wherein the core bundles (222, 322, 422 and 522), flow seals (which fill the voids above and below the core bundles 222, 322, 422, and 522) and side seals (which fill the voids on the sides of the core bundles 222, 322, 422, and 522) conform to the inner periphery of the housing to also more effectively handle or counteract the differential pressure forces in the core for the same reasons. In the second, third, fourth and fifth heat exchanger embodiments, the crossed corrugations provide structural rigidity by reason of corrugations touching and therefore carrying, by compression, the differential pressure load to the periphery of the bundle where it is picked up by the rigid seals and then transferred to the pressure vessel housing. The corrugations also impart stiffness to the port areas which must "bridge" the gaps between the seals, i.e., carry pressure loads from the port areas into the seals.

Referring now to the drawings and particularly to FIGS. 1–5, there is shown a preferred heat exchanger generally designated by the numeral 120 constructed in accordance with the present invention. The heat exchanger 120 comprises an elongated hollow, generally tubular, pressure vessel or housing 124 preferably made of stainless steel and having a wall thickness to withstand high, internal pressure. The housing 124 has inlet and outlet ports 126A/126B for a first fluid M1, an inlet and outlet ports 128A/128B for a second fluid M2. Housed within the pressure vessel 124 is a heat exchange core 122 having a configuration defining flow passageways or channels (CH1 and CH2, see FIG. 5) for the first M1 (e.g., a refrigerant flow) and second M2 (e.g., an air flow) fluid flows, respectively. These flow passageways or channels CH1 and CH2 are discrete separate passageways or channels. This can be seen more easily in FIG. 9, which depicts a rectangularly-shaped core bundle (viz., bundle 222), wherein the first fluid flow M1 can be seen passing through channels CH1 and the second fluid flow M2 can be seen passing through channels CH2.

Within each respective passageway or channel, CH1 and CH2, the first and second fluid flows M1 and M2 flow through the pressure vessel housing 124 in a parallel flow pattern. It should be understood a parallel flow pattern includes a flow pattern where M1 and M2 flow in the same direction or where M1 and M2 flow in opposite directions (known as "counter flow"). Although FIGS. 1–5 depict a counter flow pattern, it should be understood that the heat exchanger 120 (as well as the subsequent heat exchanger embodiments 220, 320, 420 and 520, to be discussed later) can also be operated in a "same-direction" parallel flow.

In the assembled core 122, the flow passageways or channels CH1 and CH2 for the first M1 and second M2 fluids are serpentine sinuous paths by reason of the criss-cross pattern of peaks (P) and valleys (V) crossing one another at right angles in the tightly folded configuration of the core 122. In particular, the corrugations are formed at an angle $\lambda$ (e.g., 45°) with the edge of the sheet metal surface, thereby creating peaks (P) and valleys (V) in the wall of each channel. It has been found that the optimum flow passageway or channel is where the angle $\lambda$ is 45°, but other angles are also suitable. When the sheet metal surface is folded and installed within the pressure vessel housing 124, these peaks P are in contact with adjacent channel peaks (P, see FIG. 2). As a result, as the flow, e.g., M1, moves through a corresponding channel, the flow M1 in a sinuous manner as the flow M1 moves along the peak of one channel wall and then encounters the peak of the other channel wall, and so on; this can be seen more easily in FIG. 6, which depicts a rectangularly-shaped core bundle (viz., bundle 222 for the second heat exchanger embodiment 220, to be discussed later) wherein the first fluid flow M1 exhibits a sinuous character (S1) and the second fluid flow M2 also exhibits sinuous character (S2). The importance of this corrugated design is that it: (1) provides constant area to the flow which reduces the pressure drop, (2) generates turbulence which promotes heat exchange and (3) due to the frequent and periodic changes in direction of the flow, causes the boundary layer that would normally form between the flow and the channel walls to disappear.

Figure 1:
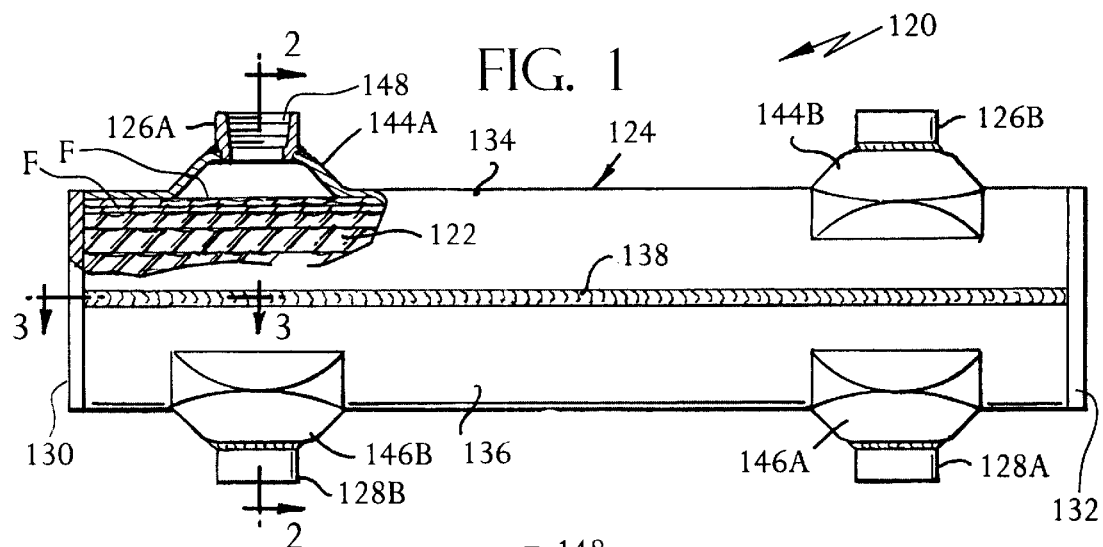
FIG. 1 is a partially-broken side view of the corrugated folded heat exchanger of the preferred embodiment of the present invention.

As can be seen in FIG. 1, the housing 124 comprises two half shells 134 and 136 which are welded along parallel diametrically opposed longitudinally extending seams by a weldment 138. This provides a side seal weld which in the present instance is formed so that it captures the tail ends 140/142 of the core bundle 122.

Figure 2:
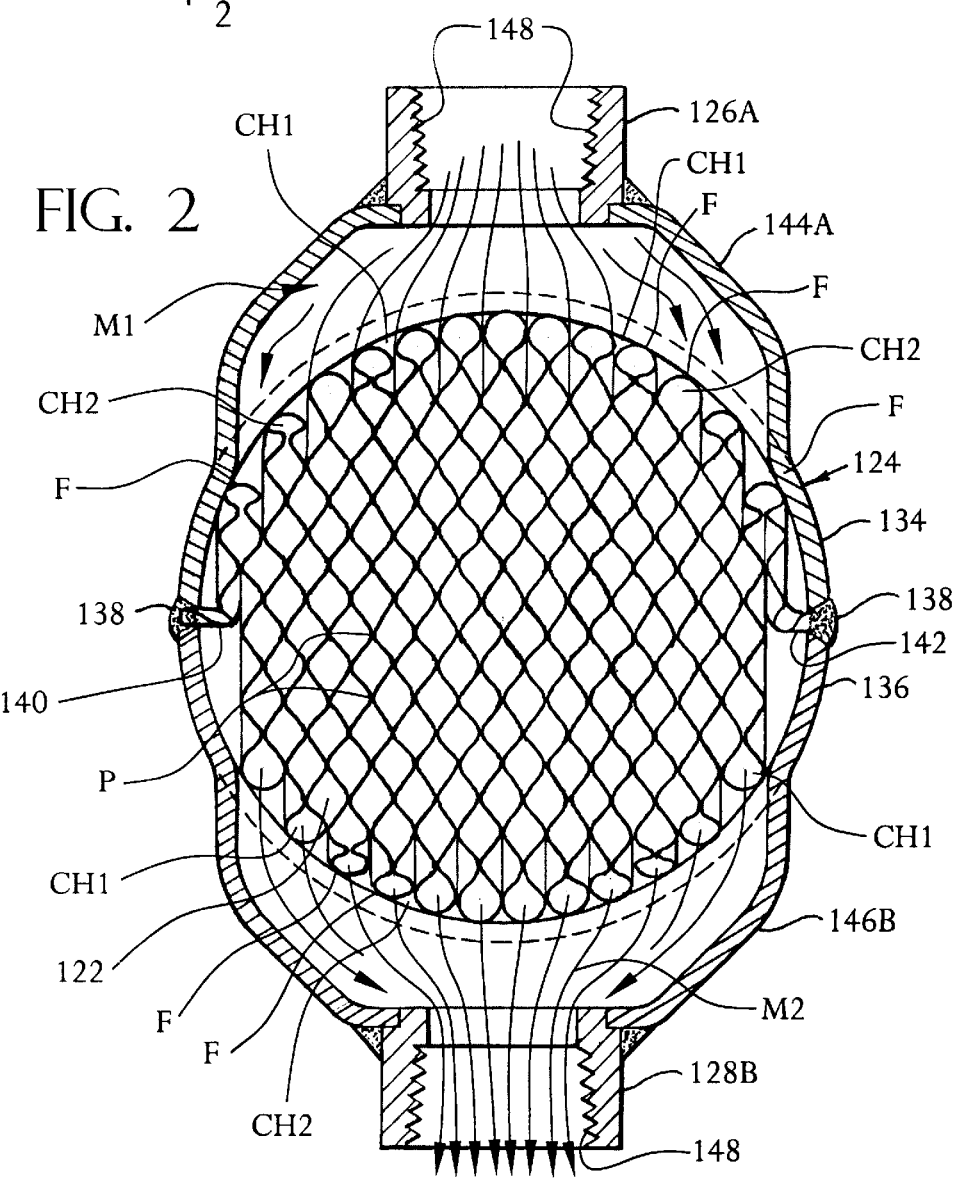
FIG. 2 is an enlarged sectional view taken on the line 2—2 of FIG. 1 showing details of the vessel half shells, associated ports, and the corrugated folded plate core positioned and retained by the two longitudinal extending welds that join the vessel half shells.

In the present instance, the heat exchanger 120 is completed by a pair of end caps 130 and 132 overlying and confronting the core 122 at opposite axial ends. Inlet manifolds 144A/146A and outlet manifolds 144B/146B are raised and formed integrally with their respective shells and have threaded cylindrical elements 148 welded to the inlet 144A/146A and outlet 144B/146B manifolds. The inlet 144A/146A and outlet 144B/146B manifolds are positioned to face the folds, F. As a result, as shown most clearly in FIG. 6, the input flow initially enters the core bundle 122 at the folds, F and then turns to flow through the channels, CH1 or CH2; similarly, at the output, the flow turns to flow away from the folds, F. It should be understood that the raised and integrally-formed manifolds are important in that the port shape optimizes pressure containment and flow. As can be seen in FIG. 2, at the input port 126A, the input flow of M1 is maximally distributed by flowing into all of the CH1 chamber openings of the bundle 122, as permitted by the manifold 144A walls. Flow (FIG. 2) is introduced into the bundle 122 at the periphery where the rounded contour of the folds (F) causes little pressure drop. Furthermore, the length of each port can be chosen to minimize pressure drop. Similarly, at the output port 128B, the output flow of M2 from the CH2 chamber openings is directed into the output port 128B by the manifold 146B walls.

In accordance with this embodiment 120, certain seals are eliminated and the side seal weld arrangement 138 provides the best structural self-support of the bundle 122 to the pressure vessel housing 124 wall. The heat exchanger 120 comprises a minimum of parts which are easy and economical to manufacture and assemble. The integral manifolds 144A/144B and 146A/146B formed into the shell halves 134/136 eliminate parts, costs and labor and improves the pressure/stress capability of the heat exchanger 120. It also permits the formation of the optimum port shape.

Figure 3:
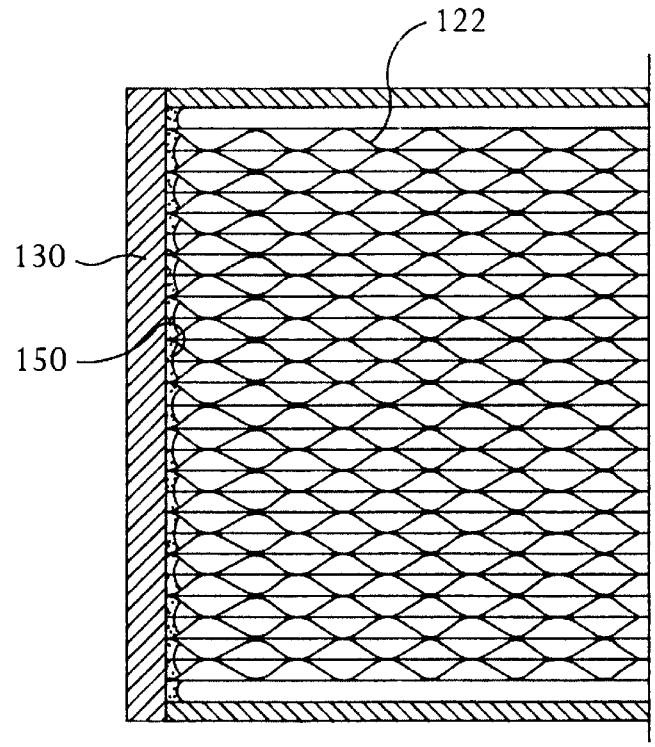
FIG. 3 is an enlarged fragmentary sectional plan view taken along line 3—3 of FIG. 1 showing the corrugated folded heat exchanger bundle having nickel brazed end seals.
Figure 4:
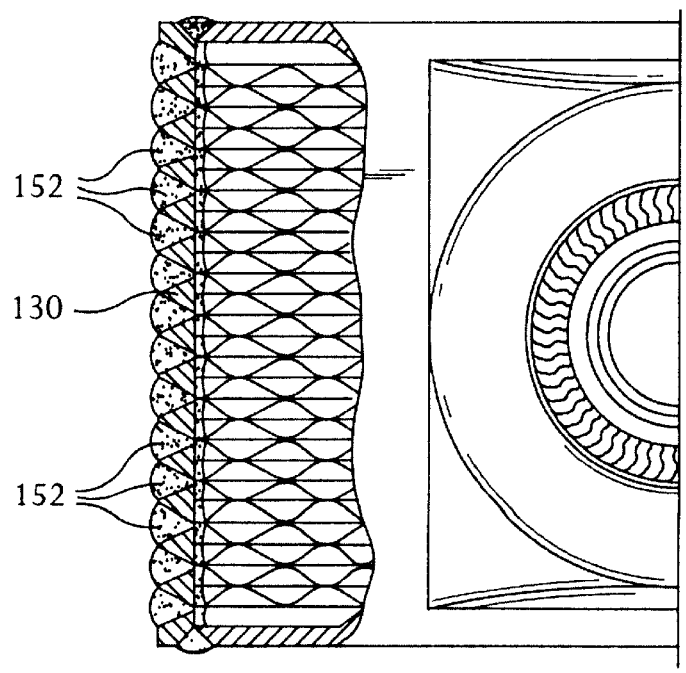
FIG. 4 is an enlarged fragmentary plain view similar to FIG. 3 with portions broken away and in section illustrating an additional modification for creating an end seal consisting of a series of through welds joining the end plates to the ends of the corrugated folded bundle.

FIGS. 3 and 4 show two different means for supporting the end plates 130 and 132 in place over the housing 124. In FIG. 3, the end plate 130 comprises an interior brazed joint 150, e.g., nickel, and in the embodiment of FIG. 4, there are a plurality of through welds 152 from the exterior wall of the end plate 130 to the end of the bundle 122.

By this method, it is possible to simultaneously create the external pressure boundary of the vessel housing 124 ends and prevent cross-over leaks. Further, the weld material can be selected to suit the duty. Tests have shown that the weld arrangement provides a very strong joint and it provides the strongest possible joint at the ends of the bundle 122. Further, it is noted that the folds of the bundle create a "stayed closure" effect, wherein the span of the closure is very small and thus the end seal can be very thin because the folds are fused into the weld metal; in particular, the maximum dimension which these end caps 130/132 must "bridge" structurally is twice the corrugation height. Also, this process lends to high speed automated assembly techniques.

In accordance with the heat exchanger 120 of the invention, the bundle 122 is round and the housing 124 comprises a pair of half shells 134/136 which are welded along the seam 138 to capture the tail ends 140/142 of the bundle 122. The design also facilitates selection of the corrugation angle, total area and length to satisfy a predetermined heat transfer rate and pressure drop criteria. It also allows selection of the proper surface thickness to satisfy total pressure containment criteria.

In this embodiment 120, the folds are staggered to fit the inside profile of the vessel whereby the optimum shape is round. It has been found that this arrangement eliminates the need for separate seals and provides structural support for the bundle and prevents movement under pressure changes. It also maximizes the amount of heat transfer surface that can be contained within a given vessel. It has been found that the best shape for the pressure containment is cylindrical. However, it should be understood that one of the patentable features of the present invention 120 is that the core bundle conform to the shape of the pressure vessel regardless of its shape. Hence, where a rectangular-shaped, square-shaped, or any other shaped, pressure vessel housing 124 is used, the core bundle 122 conforms to that particular shape.

In this embodiment 120, the bundle 122 is oversized so that on assembly, it is compressed between the shell halves 134/136 and is initially oval-shaped and compressed to a circular configuration. Accordingly, under pressure, there is no movement of the bundle 122 which could lead to failure.

Further, this arrangement distributes the pressure forces within the bundle 122 into the housing 124 and therefore extends the life of the heat exchanger 120. Optimum compression of the bundle in the shell is in the range of ten percent (10%).

In establishing the particular design of the preferred embodiment 120, the designer considers the bundle sheet material and thickness; bundle cross section dimensions; pressure vessel material and thickness; port area (length of the port); length of the main heat exchanger zone in the bundle (length between input/output ports); and the material for the end plates and joining method (e.g., braze material).

Thus, the features of the preferred embodiment 120 of the present invention provide a heat exchanger which increases the heat transfer by fifty percent (50%) while reducing the cost for the size of the heat exchanger. Furthermore, and as noted previously, there is a pressure differential between adjacent channels in the corrugated core resulting from the pressure differential of two fluids in the heat exchanger 120. For example, in an air conditioning application, Freon flows in one set of channels and is usually at a pressure different from that in the second set of channels. The pressure differential causes the channels with the higher pressure to push against adjacent channels with lower pressure. The preferred embodiment 120 of the present invention with its cross-corrugated design provides structural rigidity by reason of the adjacent corrugations touching at the peaks (P) and therefore carrying by compression, the differential load to the periphery of the bundle 122 where it is transferred to the pressure vessel housing 124 by the folds of the core bundle 122.

Another advantage of these adjacent corrugations touching at the peaks and therefore carrying by compression overcomes the problem of mechanical failure due to freezing, i.e., should a freeze condition occur within the bundle 122, only one set of passageways or channels freeze up (i.e., either CH1 or CH2 which contains a flow of water) since the "give" or "compliance" of the corrugations accommodates the expansion of the water as it freezes; then, once the ice thaws, the "give" of the folds in bundle 122 permits the restoration to their original shapes. In contrast, because the plates of conventional heat exchangers may be brazed internally to create "cells", a freezing condition followed by a thawing condition tends to rupture these braze joints, thereby requiring the heat exchanger's replacement. Thus, the heat exchanger 120 avoids this problem by not joining the peaks that are touching, internal of the core bundle 122.

A second embodiment 220 of the present invention in shown in FIGS. 6–9. As can be seen most clearly in FIGS. 7 and 8, the second embodiment 220 of the present invention also includes a core bundle 222 that comprises a corrugated sheet that is also folded to form diagonal crisscrosses of the peaks; however, the overall shape of the core bundle 222 (FIG. 9) is rectangular-shaped and does not conform to the shape of the pressure vessel housing 224. To seal the edges of the core bundle 222 to prevent commingling of the two heat exchanger fluids, M1 and M2, four embedded seals are created. A plastic material is cast in such a fashion as to embed, bond and fill the space defined at the edges and periphery of the bundle 222 and the inside surfaces of the pressure vessel 224. Embedded seals are created at the two sides and two ends of the bundle 222. The plastic material, e.g., epoxy, is introduced into the void areas to be filled by access ports. The pressure vessel 224 must be oriented for each seal so that gravity can assist the introduction of the material. Two more seals, called "flow seals," are created in the same fashion as the embedded seals. The flow seal function is to fill the voids above and below the bundle 222, between the ports. The flow seal defines one wall of each port and causes the heat exchange fluids M1 and M2 to flow into, and along, within the respective chambers CH1 and CH2 instead of flowing from port to port through the open space defined by the pressure vessel housing 224 and the bundle 222. In all cases, the seals become part of the load path, which carries the forces generated by the differential pressures within the bundle 222 into the pressure vessel 224. As with the preferred embodiment 120, the ports or header spaces perform the function of distributing the heat exchange fluids into or out of the heat exchange bundle 222 in a manner which incurs as little pressure drop as possible. In this embodiment 220, each port area is defined by the pressure vessel 224, the bundle 222, the flow seal and the end seal. The shape of each port is inherently well-suited to flow distribution. As with the preferred embodiment 120, flow is introduced into the bundle at the periphery where the rounded contour of the folds (F) causes little pressure drop. Furthermore, the length of the port can be chosen to minimize the pressure drop. These independent variables are selected by the designer to match the requirements of the heat exchanger problem as follows: bundle sheet material and thickness; bundle rectangular cross section dimensions; pressure vessel material and thickness; port area (length of the port); length of the main heat exchanger zone in the bundle (length between the ports); and material for the cast seals.

In particular, the heat exchanger 220 comprises an elongated hollow, generally tubular, vessel or housing 224 preferably made of stainless steel and having a wall thickness to withstand high, internal pressure. The housing 224 has a first fluid M1 inlet and outlet ports 226A/226B and a second fluid M2 inlet and outlet ports 228A/228B. Housed within the pressure vessel 224 is a heat exchange core bundle 222 having a configuration defining flow passageways CH1 and CH2 (see FIG. 9) for the first M1 (e.g., a refrigerant flow) and second M2 (e.g., an air flow) fluids, respectively. As illustrated by the arrows M1 and M2, first and second fluids flow through the housing 224 in a parallel flow pattern, similar to the parallel flow pattern described for heat exchanger 120. In the assembled core bundle 222, the flow passageways or channels CH1 and CH2 for the first and second fluids, respectively, are serpentine sinuous paths by reason of the crisscross pattern of peaks (P) and valleys (V) crossing one another at right angles in the tightly folded configuration of the core 222. For the same reasons set forth above with respect to the core bundle 122 of the preferred heat exchanger 120, the core bundle 222 comprises corrugations formed at an angle λ (e.g., 45°); as stated previously, it has been found that the optimum flow passageway or channel is where the angle λ is 45°. The flow passageways or channels, CH1 and CH2, however, for the first M1 and second M2 fluids are nevertheless discrete separate passageways or channels CH1 and CH2, as schematically shown in FIG. 9.

The heat exchanger 220 further includes end caps 230 and 232, which are illustrated in FIG. 6, may be welded to the open axial ends of the housing 224. End seals (229, 231) are preferably formed of a quick setting liquid epoxy material. The heat exchanger 220 further includes top and bottom seals (233,235) of the same quick-setting liquid epoxy material and side seals (237,239) as shown in FIGS. 7 and 8. The top, bottom and side seals surround the heat exchange core 222 and at their axial ends are spaced from the inlet (226A/228A) and outlet ports (226B/228B) as a cavity (C) to allow for the flow of the fluids M1 and M2 in the manner indicated in FIG. 6. Fittings 241 are provided around the periphery of the housing 224 at approximately the midway point of the housing 224 for introducing the liquid epoxy resins during assembly.

Figure 10:
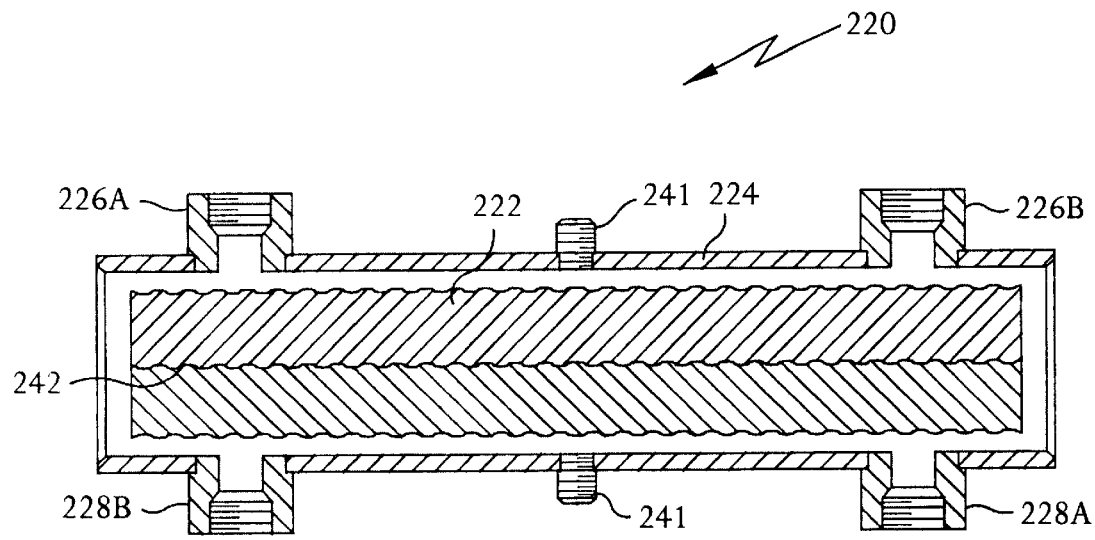
FIG. 10 is a schematic sectional plan view showing the corrugated metal core bundle frictionally inserted centrally both axially and radially within the hollowed cylindrical outer vessel comprising the first step in assembling the second embodiment heat exchanger of this invention.
Figures 11, 12:
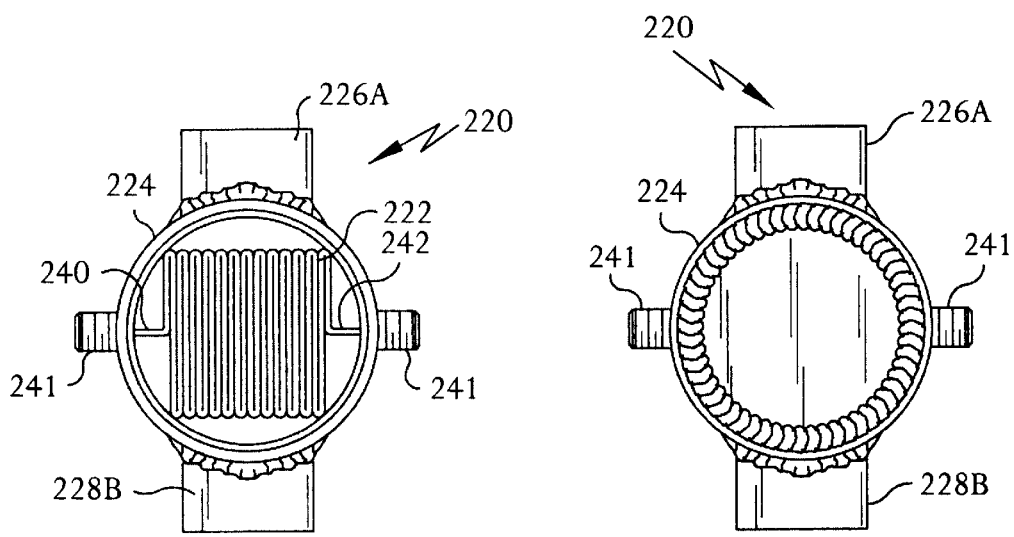
FIG. 11 is an end view of the vessel and core element as viewed from the left in FIG. 10.
FIG. 12 is an end view with the end cap welded in place.
Figure 13:
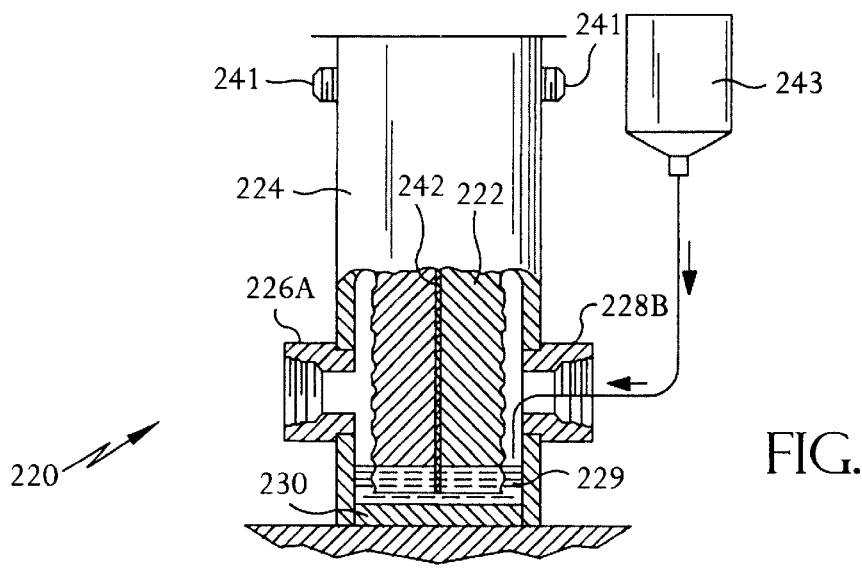
FIG. 13 is a side elevational view partly in section showing flow of epoxy into the vessel to form an end seal.
Figure 14:
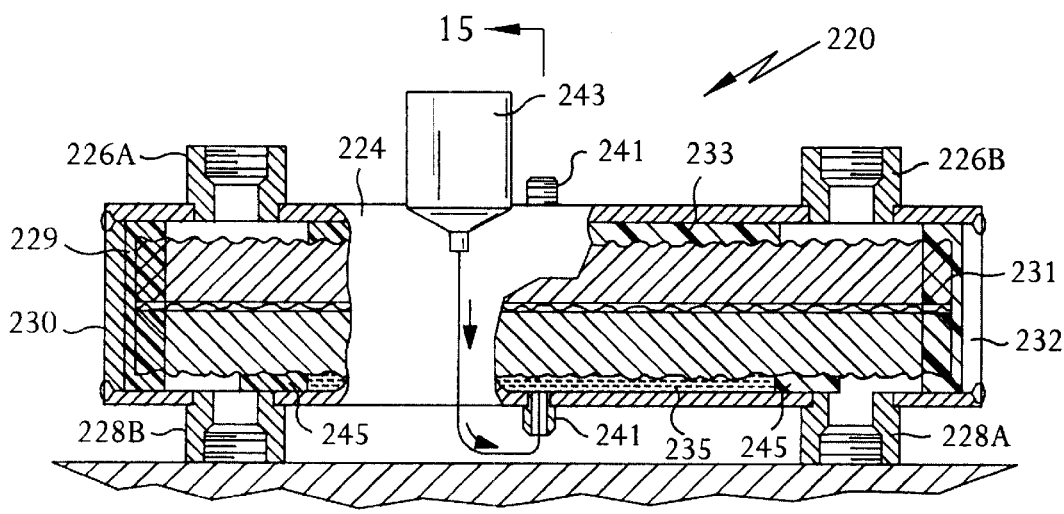
FIG. 14 is a side elevational view showing the vessel supported on a horizontal surface and the flow path for liquid epoxy to form the top and bottom seals.

The method for making the heat exchange core 222 and assembling it are best shown in FIGS. 9–15, inclusive. As with the core bundle 122 of the preferred embodiment 120, the heat exchange core 222 is preferably made of a variety of materials such as copper and aluminum depending on the heat exchange rate desired and comprises an elongated corrugated plate defining a series of peaks (P) and valleys (V) uniformly spaced and preferably disposed at an angle λ of 45° so that when the sheet is folded in the manner shown in FIG. 9, the confronting peaks P intersect and touch one another at right angles. The pattern of the core as shown in FIG. 9, includes end tabs 240 and 242 (FIG. 11) at the opposite sides to support the core 222 in the housing 224 in a manner compressing the folds as shown in FIGS. 7, 8 and 11.

Figure 15:
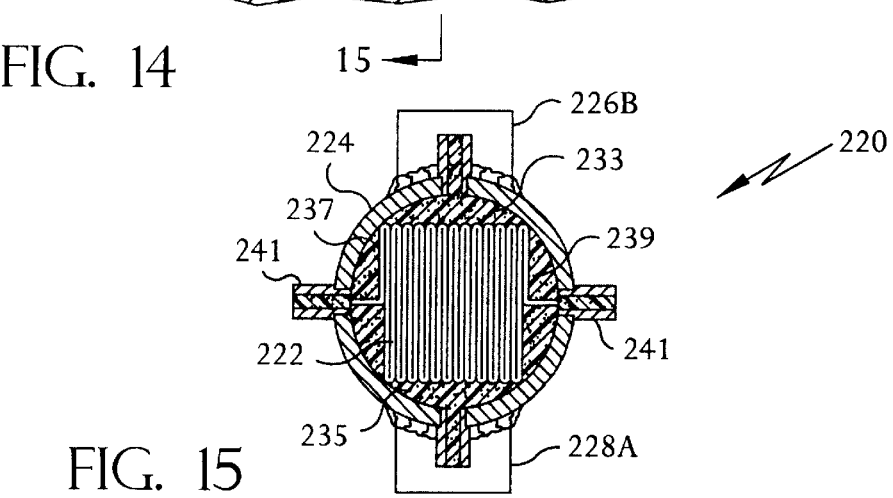
FIG. 15 is transverse cross-sectional view taken along line 15—15 of FIG. 14.

Accordingly, in assembling the components of the heat exchanger 220, the folded core 222 is initially inserted in the interior of the vessel or housing 224 so that it is spaced from opposing ends in the manner shown in FIG. 10. The end caps (230,232) are then welded in place. Thereafter, the end seals (229,231) are formed in the manner shown in FIG. 13. Specifically, the core bundle 222 is placed on end and the liquid epoxy introduced from a source 243 to a predetermined level by volume. After the end 229 seals, the core is turned upside down or reversed and the opposite end seal 231 is formed in the same way. The heat exchanger 220 is then placed on a horizontal support surface to form the top and bottom seals (233, 235). Dams 245 (FIG. 14) made of clay or rubber are then inserted through the inlet 226A/228A or outlet 226B/228A ports and positioned in the manner shown in FIG. 14 so that when the liquid epoxy is fed into the space between the dams 245, the opposing ends of the seal are spaced from the inlet 226A/228A and outlet 226B/228A ports in the manner shown in FIG. 6. It is noted that the charge or level of liquid epoxy is volume controlled to produce the desired seal around the core 222 and thereby prevent filling the flow passageways or channels CH1 and CH2 to optimize the random flow passageways in the core 222. FIG. 15 shows the side, top and bottom seals completed.

Figure 16:
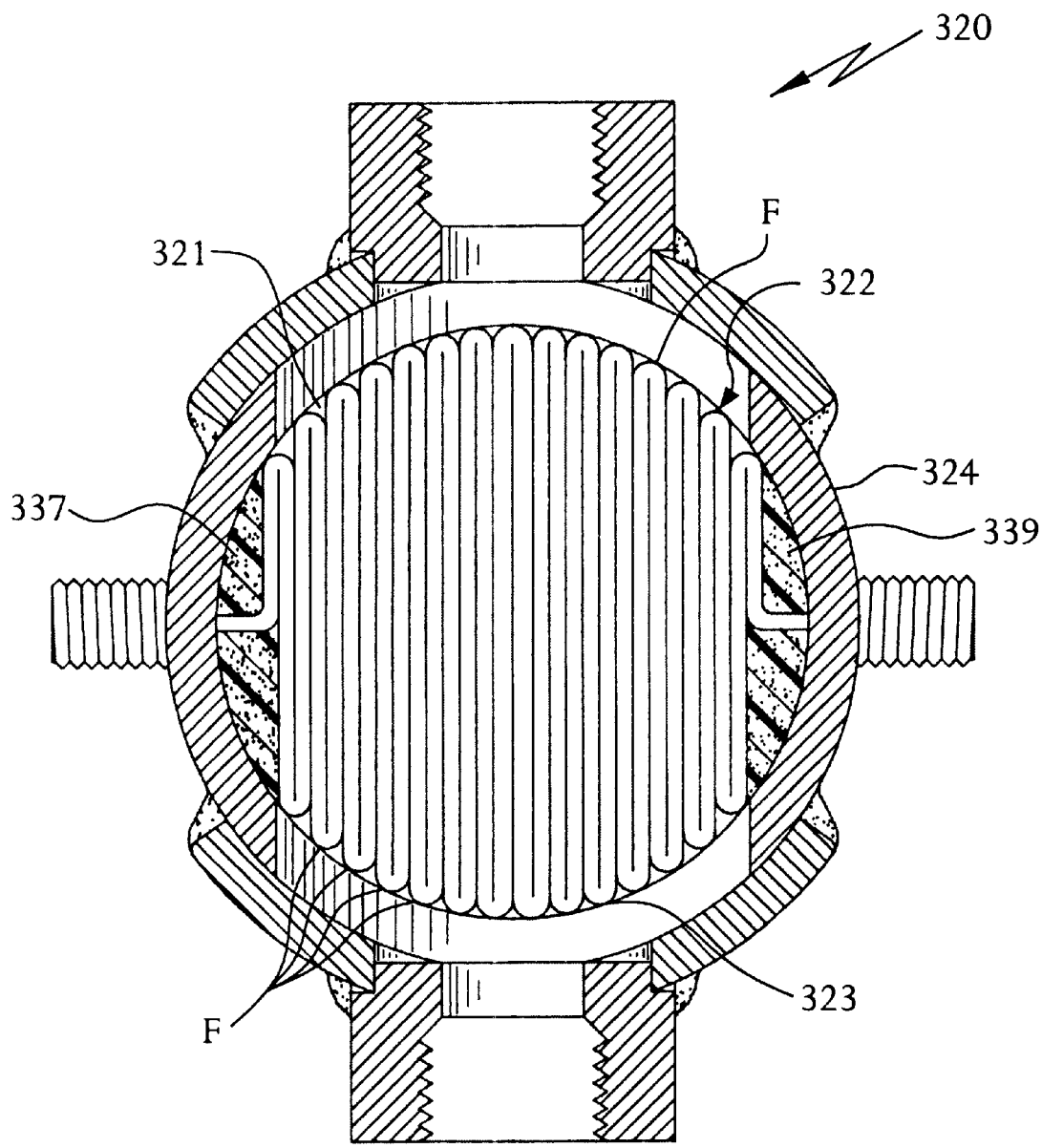
FIG. 16 is a cross-sectional view similar to FIG. 7 showing a third embodiment of the present invention that utilizes a core bundle which eliminates the need for top and bottom seals and only side seals are required by reason of the conformity of bundle to a portion of the periphery of the housing.
Figure 18:
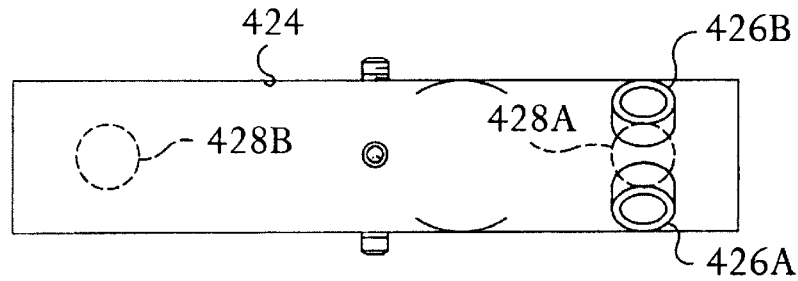
FIG. 18 is a plan view of FIG. 17.

There is shown in FIG. 16 a third embodiment 320 of the heat exchanger in accordance with the present invention. The third embodiment is similar to the heat exchanger 220 but utilizes a core bundle 322 whose folds (F) conform to the upper 321 and lower 323 inner surfaces of the pressure vessel housing 324, thereby obviating the need for top and bottom seals, although side seals 337 and 339 are required.

There is shown in FIGS. 17–21, inclusive, a fourth embodiment 420 of a heat exchange apparatus in accordance with the present invention.

This embodiment 420 is generally similar in overall arrangement and components as the second embodiment 220 and comprises a hollow generally tubular vessel or housing 424 preferably made of steel having inlet and outlet ports (426A/426B) for a first fluid medium and inlet and outlet ports (428A/428B) for a second fluid medium. Housed within the vessel or housing 424 is a heat exchange core 422 having a serpentine configuration defining flow passageways or channels CH1 and CH2 for the first and second fluids as described in detail in connection with the second embodiment 220. The heat exchange core 422, as is the core bundle 222 in the second embodiment 220, made from a generally rectangular sheet having an undulating configuration defining a series of peaks (P) and valleys (V) which when folded in the manner shown previously define the serpentine flow passages or channels CH1 and CH2 for the first and second fluid mediums. This embodiment likewise incorporates end seals (429,431) formed of a quick-setting liquid epoxy material, top, bottom, side and end seals (433, 435).

Figure 17:
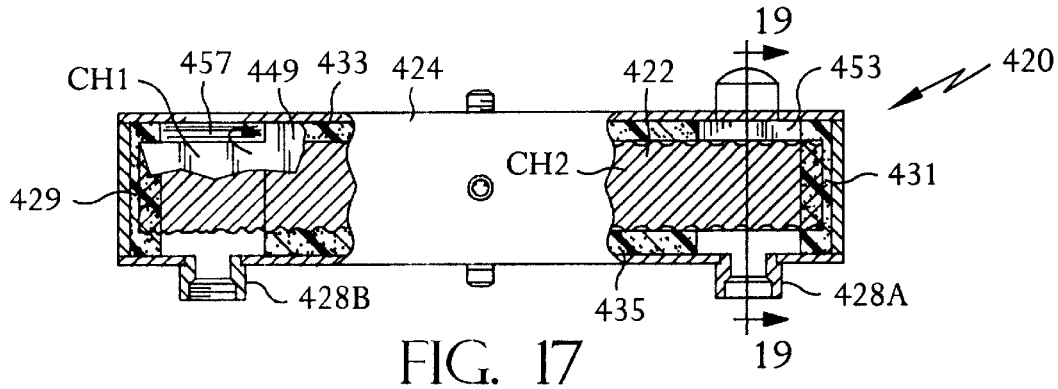
FIG. 17 is a sectional side-elevational view, similar to FIG. 6, showing a fourth heat exchanger embodiment in accordance with the present invention.
Figure 19:
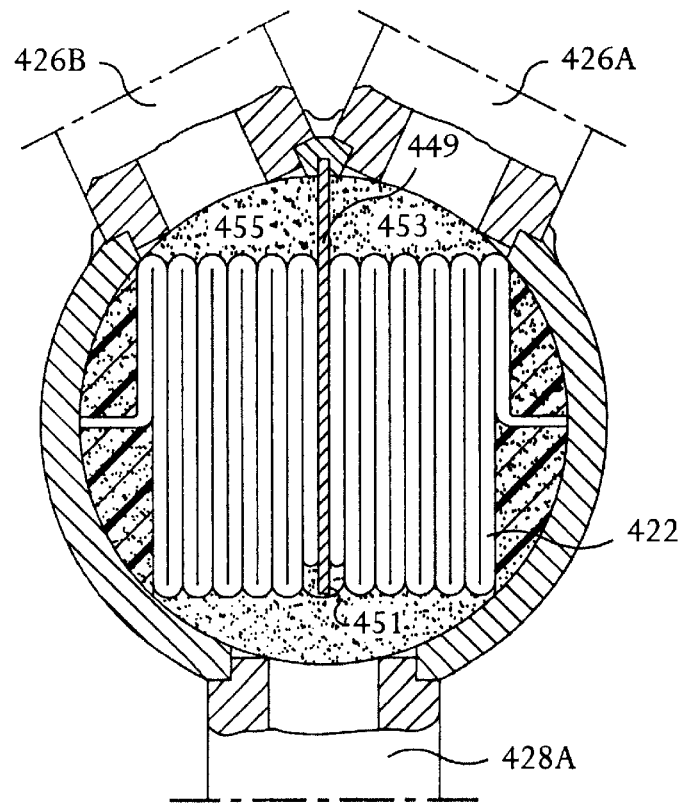
FIG. 19 is a transverse sectional view taken on lines 19—19 of FIG. 17 showing some of the fluid medium passageways more clearly.

In accordance with this embodiment 420 of the invention, an elongated upper spacer plate 449 is mounted in the housing 424 which extends as illustrated in FIG. 19 from the top interior wall of the housing 424 to the bottom edge of the core 422 as at 451 and sealed at that junction by an epoxy. The upper spacer plate 449 defines an inlet zone 453 and an outlet zone 455 for the first fluid medium adjacent the air inlet 426A and air outlet 426B, respectively. As illustrated in FIG. 17, the upper spacer plate 449 has a gap or cut out 457 adjacent the end of the housing 424 remote from the inlet end 426A to function as a turn around for one medium reversing its flow and exiting the outlet port 426B at the right hand end of the housing 424. This provides approximately a 2:1 ratio of air to refrigerant flow through the heat exchanger 420.

The inlet port 428A and outlet port 428B for the second fluid medium such as a refrigerant is as in the described embodiment and simply defines a single pathway through the core 422 entering at inlet port 428A and exiting at outlet port 428B. Considering briefly operation of this system, the first medium is essentially circulating through the core 422 exchange so that it has double the exposure for a single pass of the second fluid medium such as refrigerant.

Figure 21:
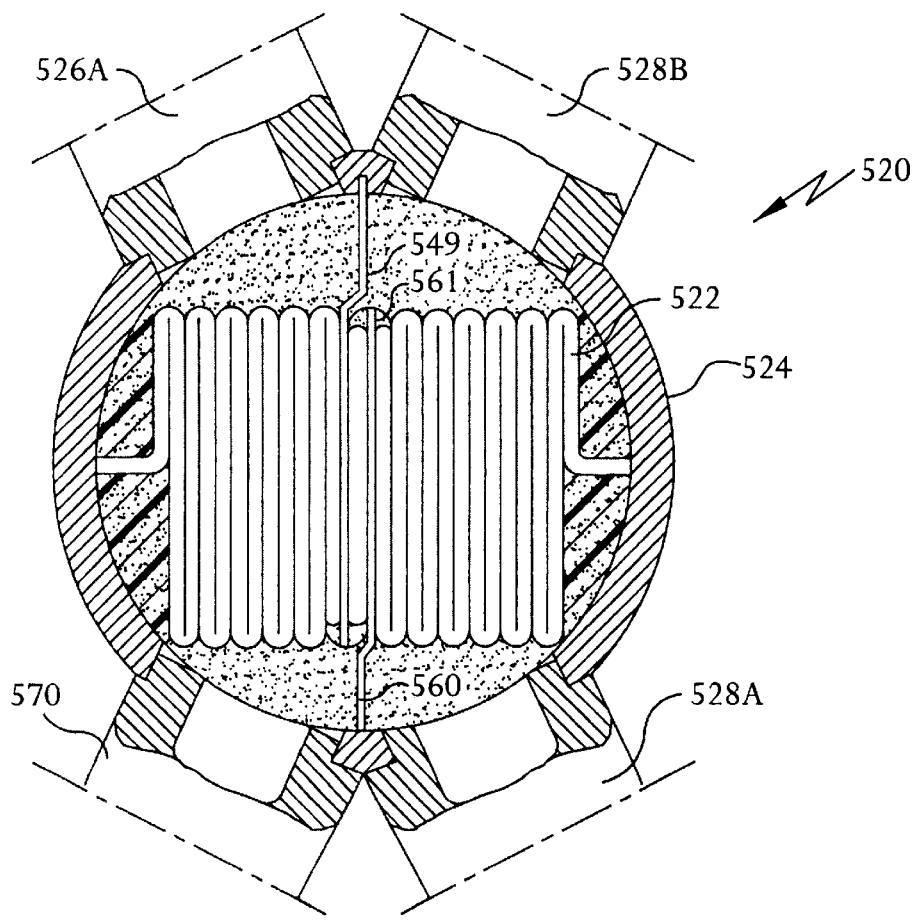
FIG. 21 is an enlarged fragmentary sectional view taken on the line 21—21 of FIG. 20 showing details of a two baffle arrangement.

There is shown in FIG. 21 a fifth embodiment 520 of the heat exchanger in accordance with the present invention. This embodiment 520 is similar to that shown in FIGS. 17–19, inclusive, except that in this instance, there is an additional baffle designated by the numeral 560. The baffle 560 extends from the interior surface of the pressure vessel or housing 524 below the core 522 to the upper terminal edge of the core 522, via a spacer plate 549 portion, where it is sealed at 561 by an epoxy.

Figure 20:
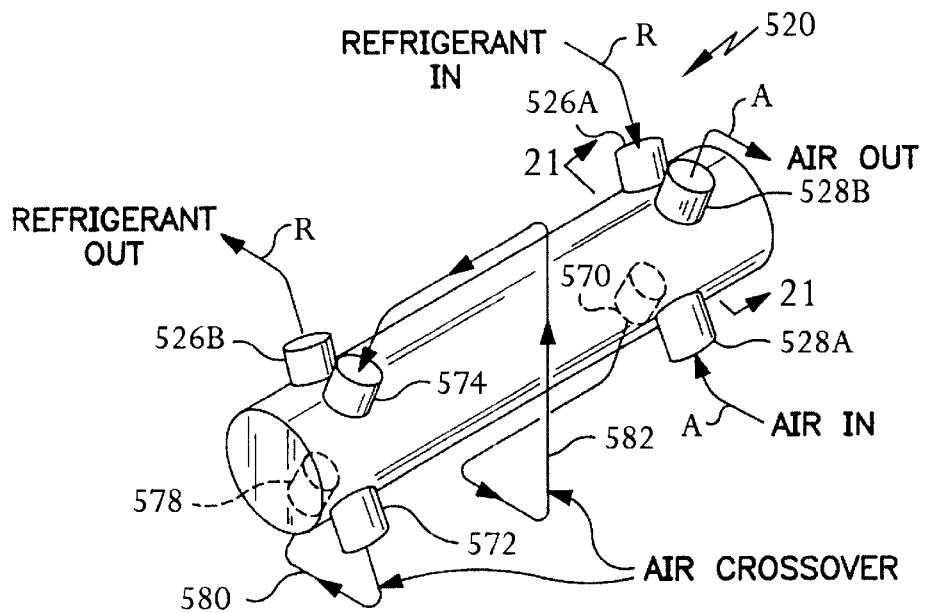
FIG. 20 is a schematic isometric view showing a fifth embodiment of heat exchanger in accordance with the present invention wherein the fluid medium flow paths for both fluids are separated by two baffles.

The housing 524 is provided with a plurality of ports and connecting piping for selectively varying the pattern of flow of air and refrigerant through the core 522 and specifically to achieve multiple passes of air for a given flow of refrigerant through the heat exchanger 520. For example, in the embodiment illustrated in FIGS. 20–21, the ports, connecting pipes and baffle arrangement facilitates flow through the core 522 divided into four flow quadrants of which three are for circulating air and one for refrigerant. It is noted that many variations are possible to achieve different flow ratios and configurations. Thus, as shown in FIG. 20, the one end of the heat exchanger 520 has an air inlet port 528A, an air outlet port 528B, a refrigerant inlet port 526A and an air transfer port 570. The opposite end of the housing has an air transfer port 572, an air transfer point inlet port 574, a refrigerant outlet port 526B and a transfer air inlet port 578. Pipe 580 connects ports 572/578, pipe 582 connects ports 570/574). By this arrangement, the flow of refrigerant (R) and air (A) through the heat exchanger 520 is as shown schematically in FIG. 20. This arrangement, as illustrated, produces a flow of air (A) in three of the quadrants and refrigerant (R) in one of the divided quadrants of the core 522.

Without further elaboration, the foregoing will so fully illustrate our invention that others may, by applying current or future knowledge, readily adopt the same for use under various conditions of service. Even though particular embodiments of the invention have been illustrated and described herein, it is not intended to limit the invention and changes and modifications may be made therein within the scope of the following claims:

We claim:

1. A heat exchanger for supporting heat exchange between two high pressure fluid media flowing therein, said heat exchanger comprising:
   a core comprising a continuous sheet having continuous corrugations running angularly to the direction of said sheet, said core being folded to form a plurality of folds, said continuous sheet having extreme ends that are not folded;
   a pair of symmetrical elongated housing shells, each having a respective pair of side edges, that compress said core when joined at said respective pair of side edges such that said plurality of folds conform to the shape of an interior wall formed by the joined elongated housing shells, said extreme ends of said folded sheet being captured by said joined symmetrical elongated housing shells along said respective pair of side edges, said joined symmetrical elongated housing shells forming a heat exchanger housing;
   said housing having a first set of inlet and outlet ports for circulating a first medium through said housing and a second set of inlet and outlet ports for circulating a second medium through said housing;
   said compressed core forming alternating isolated channels within said housing without the need for any sealants, said alternating isolated channels comprising a first set of channels that is in fluid communication with said first set of ports and a second set of channels that is in fluid communication with said second set of ports, said first and second media forming parallel flows within said respective sets of channels;
   wherein the interior of each one of said first and second set of channels comprise crossed corrugations that are in contact with each other, said crossed corrugations not being joined together; and
   said core transmitting forces from differential internal pressures, caused by said first and second flowing media, to said housing.

2. The heat exchanger of claim 1 wherein each one of said inlet ports comprise an inlet manifold, said inlet manifold being formed integrally with said housing and located opposite a set of folds to distribute inlet flow in between a maximum number of said set of folds.

3. The heat exchanger of claim 1 wherein each one of said outlet ports comprise an outlet manifold, said outlet manifold being formed integrally with said housing and located opposite a set of folds to capture outlet flow emanating from between a maximum number of folds.

4. The heat exchanger of claim 1 wherein said each one of said pair of symmetrical elongated housing shells comprises one-half of a cylinder and wherein said folded core initially forms an oval shape such that when said pair of housing shells are joined together, said folded core is compressed to form a cylindrical shape.

5. The heat exchanger of claim 4 wherein said half shells are fixedly joined by welding to form said seams.

6. A method for providing a heat exchanger for supporting heat exchange between two high pressure fluid media:
   (a) providing a continuous sheet having corrugations running angularly to the direction of the sheet and wherein each of said corrugations is continuous;
   (b) providing a first elongated housing shell having a first set of input and output ports for a first medium flow and a second elongated housing shell having a second set of input and output ports for a second medium flow, each of said shells having a respective pair of side edges, said first and second elongated housing shells being symmetrical;
   (c) folding said continuous sheet, excluding the extreme ends thereof, to form a core having a plurality of folds and two unfolded extreme ends;
   (d) positioning said core into said first elongated housing shell so that each one of said extreme ends of said continuous sheet is positioned on a respective side edge of said first elongated housing shell;
   (e) joining said second elongated housing shell to said first elongated housing shell along their respective side edges while capturing said extreme ends of said core between said respective side edges, said joining compressing said core to conform to the shape of an interior wall formed by the joined housing shells such that each of said one of said plurality of folds is in contact with said interior wall and wherein said corrugations cross each other and are in contact with each other but are not joined where said corrugations contact, said compressed core forming alternating isolated channels within said housing without the need for any sealants; and
   (f) closing off a first end of said housing and a second end of said housing.

7. The method of claim 6 further comprising the steps of:
   (a) coupling a first medium flow to said input port of said first set of ports and coupling said output port of said first set of ports to a next process stage; and
   (b) coupling a second medium flow to said input port of said second set of ports and coupling said output port of said second set of ports to another process stage.

8. The method of claim 6 wherein said step of providing said symmetrical first and second elongated shells comprises forming said input ports of said first and second set of ports to distribute a respective input flow in between a maximum number of respective folds that face said input ports.

9. The method of 6 wherein said step of providing said symmetrical first and second elongated shell comprises forming said output ports of said first and second set of ports to capture from between a maximum number of respective folds that face said output ports.

10. The method of claim 6 wherein:
   (a) said step of providing a first elongated housing shell and a second elongated housing shell comprises providing a first elongated half cylindrical shell and a second elongated half cylindrical shell;
   (b) said step of folding said continuous sheet comprises folding said sheet into a plurality of folds to form an oval-shaped core; and
   (c) wherein said step of joining said second elongated housing shell to said first elongated housing shell comprises compressing said core into a cylindrical shape.

11. The method of claim 6 wherein said step of joining said second elongated housing shell to said first elongated housing shell comprises welding said shells together.

* * * * *